(12) United States Patent
O'Cleirigh et al.

(10) Patent No.: US 11,169,641 B2
(45) Date of Patent: *Nov. 9, 2021

(54) COMPLIANT STYLUS INTERACTION WITH TOUCH SENSITIVE SURFACE

(71) Applicant: Beechrock Limited, Castletown (IM)

(72) Inventors: Niall O'Cleirigh, San Mateo, CA (US); Owen Drumm, Dublin (IE); Olivier Mathis, San Mateo, CA (US); Danil Korchagin, San Mateo, CA (US); Mihailo Kolundzija, Lausanne (CH); Frederic Bourbon, San Mateo, CA (US); Julien Piot, Rolle (CH)

(73) Assignee: Beechrock Limited, Castletown (IM)

( * ) Notice: Subject to any disclaimer, the term of this patent is extended or adjusted under 35 U.S.C. 154(b) by 0 days.

This patent is subject to a terminal disclaimer.

(21) Appl. No.: 16/254,420

(22) Filed: Jan. 22, 2019

(65) Prior Publication Data
US 2019/0227670 A1    Jul. 25, 2019

Related U.S. Application Data

(60) Provisional application No. 62/620,927, filed on Jan. 23, 2018.

(51) Int. Cl.
*G06F 3/042* (2006.01)
*G06F 3/041* (2006.01)
(Continued)

(52) U.S. Cl.
CPC ........ *G06F 3/0421* (2013.01); *G06F 3/03545* (2013.01); *G06F 3/048* (2013.01); *G06F 3/0416* (2013.01)

(58) Field of Classification Search
CPC ...... G06F 3/0421; G06F 3/048; G06F 3/0416; G06F 3/03545
See application file for complete search history.

(56) References Cited

U.S. PATENT DOCUMENTS 6,498,602 B1 * 12/2002 Ogawa ............... G06F 3/03545
178/18.01
6,876,356 B2 * 4/2005 Zloter ................. G06F 3/03545
178/19.01

(Continued)

FOREIGN PATENT DOCUMENTS

KR    20170035305 A    3/2017

OTHER PUBLICATIONS

PCT International Search Report and Written Opinion, PCT Application No. PCT/IB2019/000110, dated Jun. 17, 2019, 13 pages.

*Primary Examiner* — David D Davis
(74) *Attorney, Agent, or Firm* — Fenwick & West LLP

(57) ABSTRACT

A touch sensitive surface has emitters and detectors arranged around a periphery of the touch sensitive surface. The emitters produce optical beams that are received by the detectors. A stylus is configured to disturb one or more of the optical beams by a variable amount when in contact with the touch sensitive surface. The variable amount depends on an amount of force applied to the stylus towards the touch sensitive surface. A controller of the touch sensitive surface is configured to determine the touch strength of a touch event performed by the stylus based on disturbances of one or more of the optical beams. The touch strength provides a measure of the amount of force applied to the stylus.

22 Claims, 23 Drawing Sheets

(51) Int. Cl.
*G06F 3/0354* (2013.01)
*G06F 3/048* (2013.01)

(56) References Cited

U.S. PATENT DOCUMENTS

| | | | |
|---|---|---|---|
| 9,965,101 B2 | 5/2018 | Drumm et al. | |
| 2001/0012002 A1* | 8/2001 | Tosaya | B06B 1/0655 345/179 |
| 2002/0015159 A1* | 2/2002 | Hashimoto | G01B 11/002 356/620 |
| 2006/0001654 A1 | 1/2006 | Smits | |
| 2008/0166048 A1* | 7/2008 | Raif | G06F 3/03545 382/187 |
| 2008/0259053 A1* | 10/2008 | Newton | G06F 3/0421 345/175 |
| 2009/0146992 A1 | 6/2009 | Fukunaga et al. | |
| 2009/0167728 A1* | 7/2009 | Geaghan | G06F 3/03542 345/179 |
| 2011/0181552 A1* | 7/2011 | Goertz | G06F 3/042 345/175 |
| 2013/0285977 A1* | 10/2013 | Baharav | G06F 3/0414 345/174 |
| 2014/0098058 A1* | 4/2014 | Baharav | G06F 3/0421 345/174 |
| 2014/0152624 A1* | 6/2014 | Piot | G06F 3/042 345/175 |
| 2014/0168142 A1 | 6/2014 | Sasselli et al. | |
| 2014/0267180 A1 | 9/2014 | Buelow et al. | |
| 2015/0286293 A1* | 10/2015 | Gruhlke | G06F 3/03542 345/182 |
| 2015/0309662 A1 | 10/2015 | Wyrwas et al. | |
| 2016/0170563 A1* | 6/2016 | Drumm | G06F 3/0421 345/175 |
| 2018/0136747 A1* | 5/2018 | Keam | G06F 3/03545 |
| 2018/0267671 A1* | 9/2018 | Lee | G06F 3/0421 |

* cited by examiner

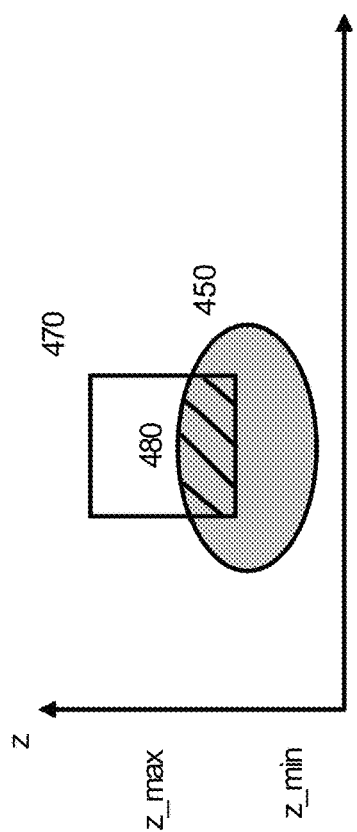
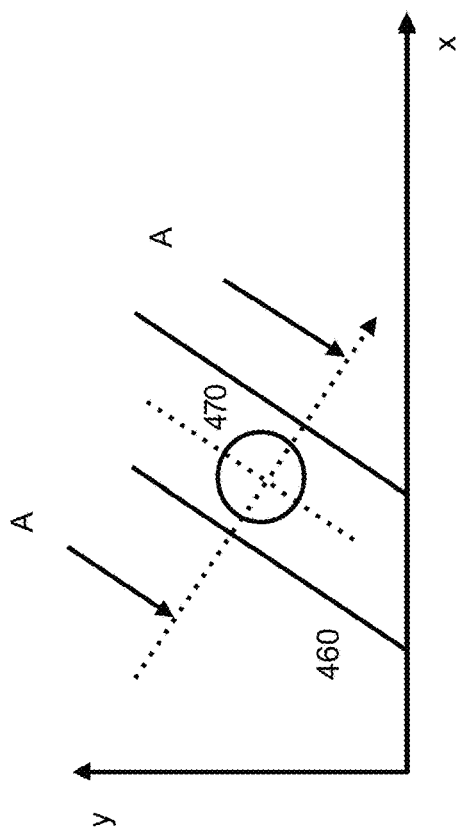

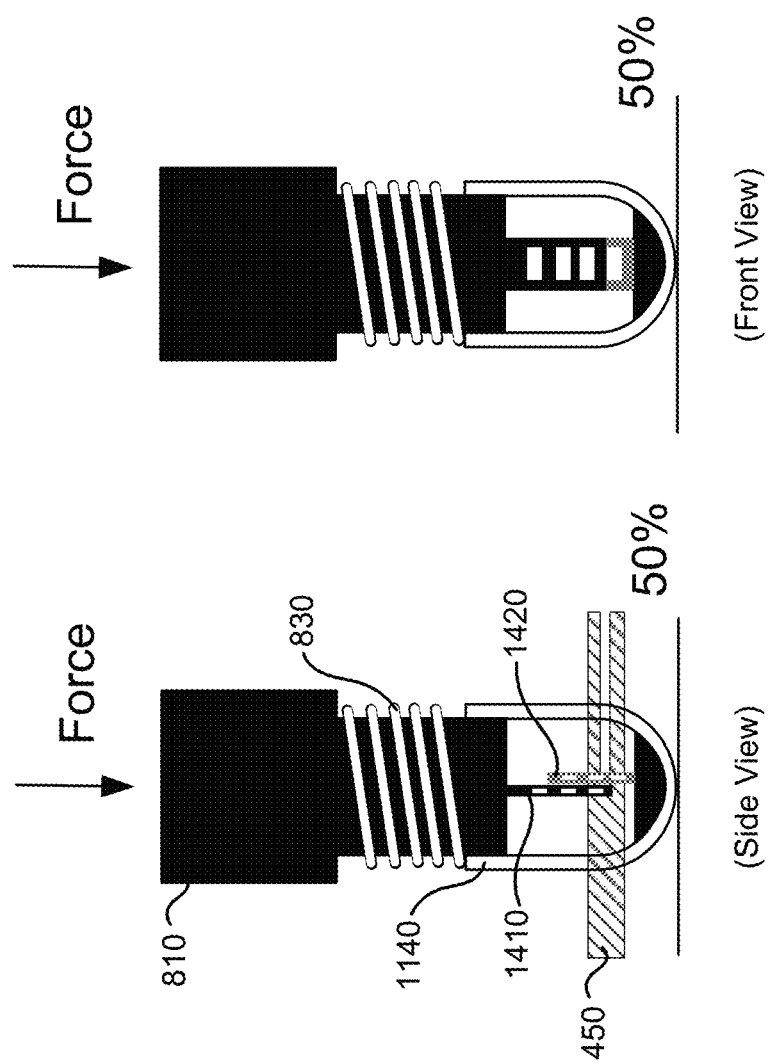

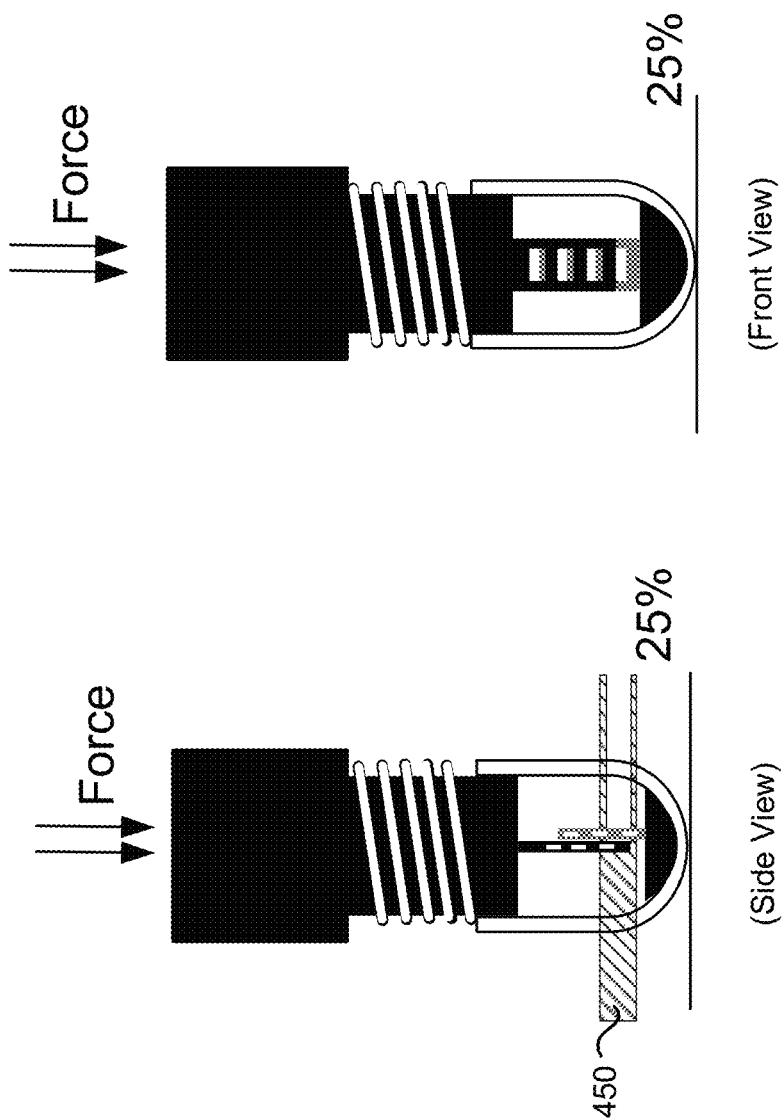

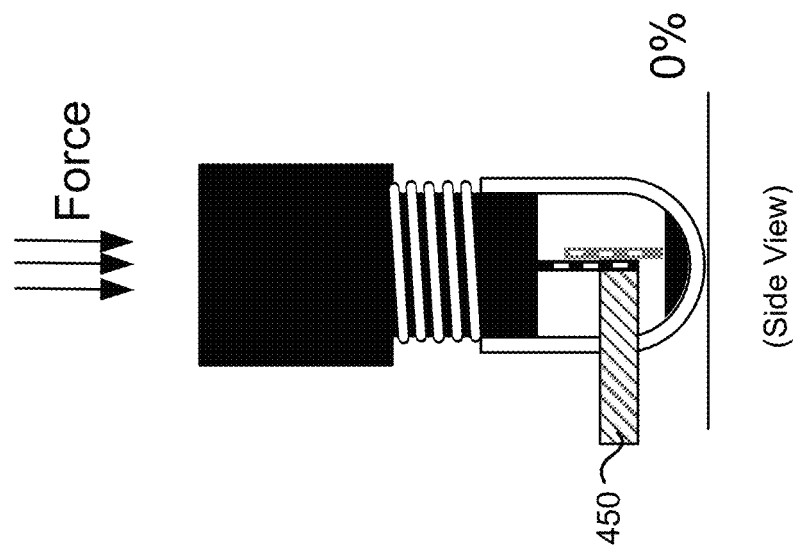
FIG. 14E (Side View)
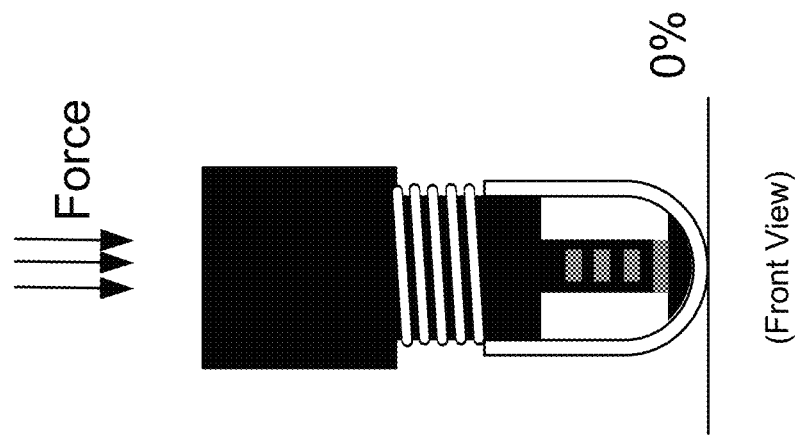
FIG. 14F (Front View)

COMPLIANT STYLUS INTERACTION WITH TOUCH SENSITIVE SURFACE

CROSS REFERENCE TO RELATED APPLICATIONS

This application claims the benefit of priority to U.S. Provisional Patent Application No. 62/620,927, filed on Jan. 23, 2018, which is incorporated herein by reference in its entirety for all purposes.

BACKGROUND

1. Field of Art

This description generally relates to a stylus interacting with a surface of touch-sensitive device, and specifically to a stylus configured to disturb optical beams by a variable amount dependent on an amount of force applied to the stylus towards the surface of the device.

2. Description of the Related Art

Touch-sensitive displays for interacting with computing devices are becoming more common. A number of different technologies exist for implementing touch-sensitive displays and other touch-sensitive devices. Examples of these techniques include, for example, resistive touch screens, surface acoustic wave touch screens, capacitive touch screens and certain types of optical touch screens.

While touch objects are generally fingers, solutions exist to support detection of other touch objects types, such as styli. However, stylus operations on capacitive touch systems require a conductive tip and feel unresponsive to varying contact strength. To detect contact strength on the display, an active stylus includes force or pressure sensors and a means to actively communicate with the touch system. More elaborate solutions use an active stylus that is detected by an electromagnetic sensor. However, adding an electromagnetic sensor drives up the cost and power consumption of the stylus. Despite these solutions, touch systems can still lack a progressive and consistent response to an applied stylus stroke. Furthermore, the requirement to regularly replace batteries for these active styli can be a cause for user frustration and additional expense.

SUMMARY

An optical touch-sensitive device may determine the locations of touch events. The optical touch-sensitive device includes multiple emitters and detectors. Each emitter produces optical radiant energy which is received by the detectors. In some embodiments, the optical emitters are frequency or code-division multiplexed in a manner so that many optical sources can be received by a detector simultaneously. Alternatively, emitters are time multiplexed and are activated sequentially in a predefined sequence. Touch events disturb the optical energy transfer from emitter to detector. Variations in light transfer resulting from the touch events are captured, and are used to determine the touch events. In one aspect, information indicating which emitter-detector pairs have been disturbed by touch events is received. The light disturbance for each pair is characterized and used to determine the beams attenuation resulting from the touch events.

The emitters and detectors may be interleaved around the periphery of the sensitive surface. In other embodiments, the number of emitters and detectors are different and are distributed around the periphery in a defined order. The emitters and detectors may be regularly or irregularly spaced. In some cases, the emitters and/or detectors may be located on less than all of the sides (e.g., one side). Reflectors may also be positioned around the periphery to reflect optical beams, causing the path from the emitter to the detector to pass across the surface more than once. For each emitter-detector pair, a beam is defined by combining light rays propagating from an emitter and a detector. In some implementations, the disturbance of a beam is characterized by its transmission coefficient, and the beam attenuation is determined from the transmission coefficient.

In embodiments for current day tablet and similarly sized devices, emitter/detector spacings preferably are in a range of 1-12 millimeters (mm). For many applications, a spacing of 3-6 mm offers the capability of both good all-round resolution and good touch separation (e.g., the ability to distinguish individual touches which are close to each other).

Touch position and touch strength can be determined based on beam attenuation. Among other uses, touch strength is useful for drawing or hand writing applications (annotations). In various embodiments, touch strength is determined from optical beams disturbed by a compliant stylus. Touch strength reflects the user interaction intensity and enables a more natural user experience by visualizing annotations (or other content) on a touch sensitive device differently based on a force applied to the stylus. For example, in a drawing application, line thickness may increase as touch strength increases.

Some embodiments relate to a system including a touch sensitive surface, a stylus, and a controller. The touch sensitive surface has emitters and detectors arranged around a periphery of the surface, the emitters producing optical beams received by the detectors. The stylus may be passive and is configured to disturb one or more of the optical beams by a variable amount when in contact with the touch sensitive surface. The variable amount is dependent on an amount of force applied to the stylus towards the touch sensitive surface. For example, the variable amount may be proportional to the amount of force applied to the stylus towards the touch sensitive surface. The controller is configured to determine the touch strength of a touch event on the touch sensitive surface by the stylus based on disturbances of one or more of the optical beams. The touch strength provides a measure of the amount of force.

In some embodiments, the stylus includes a stylus body and an envelope. The stylus body has an end portion that is opaque to optical beams. The envelope surrounds the end portion and is partially transparent to optical beams. The envelope is configured to slide along the end portion by an amount dependent on the amount of force applied to the stylus towards the surface.

In some embodiments, the stylus includes a stylus body, a spring, and an envelope. The stylus body has a central axis that is substantially parallel to a force measured by the stylus when the stylus is in contact with the surface. The spring is attached to an end of the stylus body and orientated to compress along a direction parallel to the central axis. The envelope is connected to the spring and surrounds the spring. The envelope is, at least partially, transparent to optical beams.

In some embodiments, the stylus includes a stylus tip. The stylus tip contacts the surface during a touch event. The stylus tip includes a first grating and a second grating aligned with the first grating. The gratings move relative to one another by an amount dependent on the amount of force applied to the stylus towards the surface. The stylus may also include a stylus body connected to the first grating. The stylus body has a central axis that is substantially parallel to a force measured by the stylus when the stylus is in contact with the surface. Additionally, the stylus tip may include an envelope surrounding the gratings and connected to the second grating. The envelope is configured to slide along the stylus body in a direction parallel to the central axis. The first grating and the second grating may each form a cylinder. The first cylinder is nested inside the second cylinder, and the first grating rotates relative to the second grating by an amount determined by the force applied to the stylus towards the surface. The envelope may be connected to the stylus body by an elastomeric material. In some embodiments, the first grating and second grating have apertures with a longest dimension less than or equal to 2 millimeters.

In some embodiments, the stylus includes a stylus tip that contacts the surface during a touch event. The stylus also includes a stylus body that has a central axis that is substantially parallel to a force measured by the stylus when the stylus is in contact with the surface. The stylus body has a cavity that surrounds at least a portion of the stylus tip, and the stylus body is configured to slide parallel to the central axis and along the tip by an amount dependent on the amount of force applied to the stylus towards the surface. The stylus body may be tapered towards the stylus tip. A width of the stylus body may be sufficient to disturb two or more optical beams. At least a portion of the surface of stylus body may include a reflective material and the stylus tip may include rubber.

In some embodiments, the stylus includes a stylus body and a tip. The tip is connected to an end of the stylus body and includes compliant material. The tip may form an optical lens that deforms dependent on the amount of force applied to the stylus towards the surface.

Alternative embodiments relate to a stylus configured to contact a touch sensitive surface having emitters and detectors arranged around a periphery of the touch sensitive surface. The emitters produce optical beams received by the detectors. The stylus disturbs one or more of the optical beams by a variable amount when in contact with the touch sensitive surface. The variable amount is dependent on an amount of force applied to the stylus towards the touch sensitive surface.

Alternative embodiments relate to a method. Optical beams are produced from emitters around a periphery of a touch sensitive surface. The optical beams are received by detectors arranged around the periphery of the touch sensitive surface. A controller determines a touch strength for a touch event on the touch sensitive surface based on disturbances of one or more of the optical beams. The touch event is caused by a stylus configured to disturb one or more optical beams by a variable mount when in contact with the touch sensitive surface. The variable amount is dependent on the amount of force applied to the stylus towards the touch sensitive surface, and the touch strength provides a measure of the amount of force.

BRIEF DESCRIPTION OF DRAWINGS

Embodiments of the present disclosure will now be described, by way of example, with reference to the accompanying drawings.

FIGS. 4B and 4D are graphs of cross-sections of beams and tips.

FIG. 4C is a top view of a beam and a circular cylindrical tip.

FIGS. 14A-14F illustrate front and side views of gratings or grills which progressively occlude beams as applied force is increased, according to some embodiments.

DETAILED DESCRIPTION

I. Introduction

A. Device Overview

Figure 1:
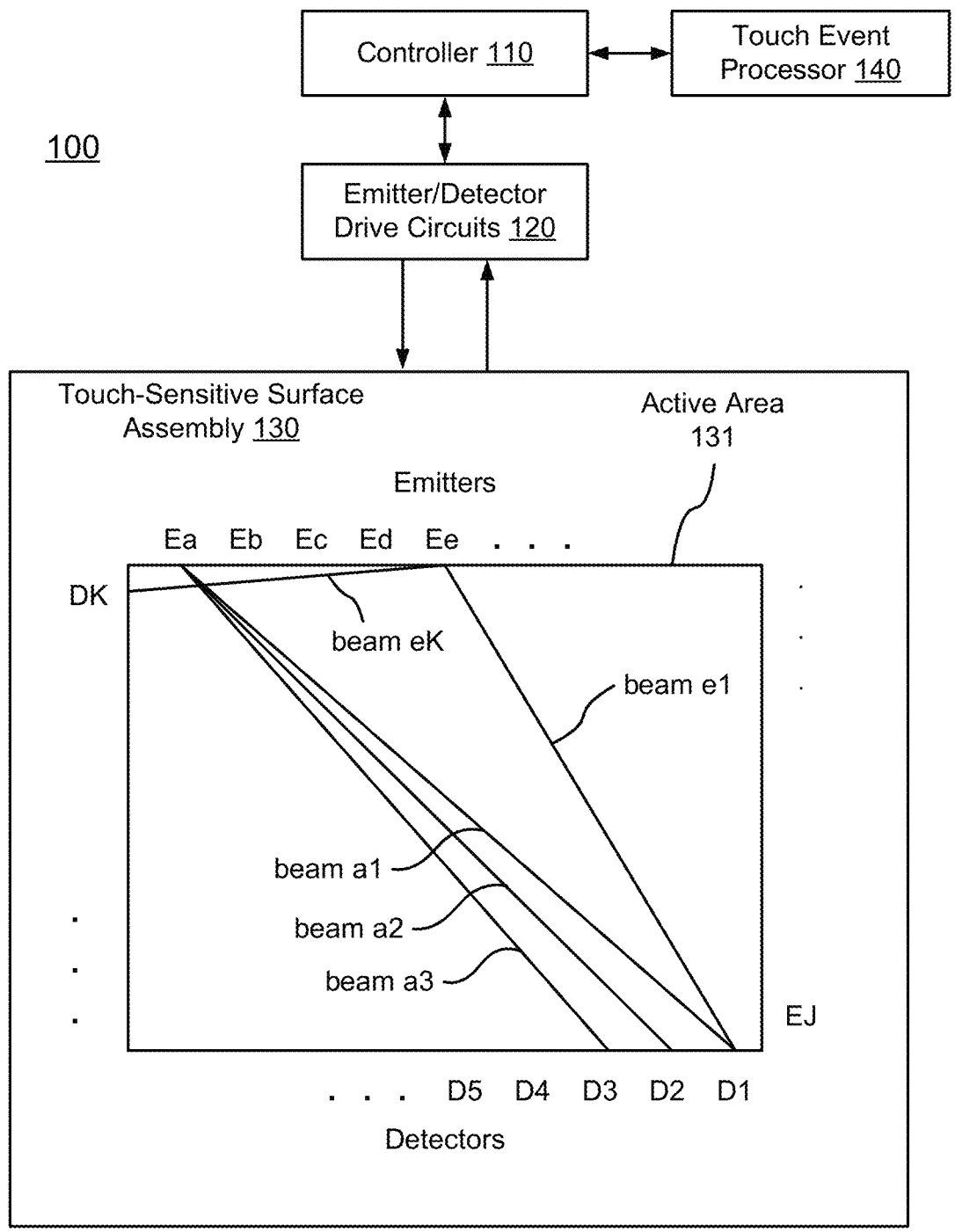
FIG. 1 is a diagram of an optical touch-sensitive device, according to one embodiment.

FIG. 1 is a diagram of an optical touch-sensitive device 100, according to one embodiment. The optical touch-sensitive device 100 includes a controller 110, emitter/detector drive circuits 120, and a touch-sensitive surface assembly 130. The surface assembly 130 includes a surface 131 over which touch events are to be detected. For convenience, the area defined by surface 131 may sometimes be referred to as the active area or active surface, even though the surface itself may be an entirely passive structure. The assembly 130 also includes emitters and detectors arranged along the periphery of the active surface 131. In this example, there are J emitters labeled as Ea-EJ and K detectors labeled as D1-DK. The device also includes a touch event processor 140, which may be implemented as part of the controller 110 or separately as shown in FIG. 1. A standardized API may be used to communicate with the touch event processor 140, for example between the touch event processor 140 and controller 110, or between the touch event processor 140 and other devices connected to the touch event processor.

The emitter/detector drive circuits 120 serve as an interface between the controller 110 and the emitters Ej and detectors Dk. The emitters produce optical "beams" which are received by the detectors. Preferably, the light produced by one emitter is received by more than one detector, and each detector receives light from more than one emitter. For convenience, "beam" will refer to the light from one emitter to one detector, even though it may be part of a large fan of light that goes to many detectors rather than a separate beam. The beam from emitter Ej to detector Dk will be referred to as beam jk. FIG. 1 expressly labels beams a1, a2, a3, e1 and eK as examples. Touches within the active area 131 will disturb certain beams, thus changing what is received at the detectors Dk. Data about these changes is communicated to the touch event processor 140, which analyzes the data to determine the location(s) (and times) of touch events on surface 131.

One advantage of an optical approach as shown in FIG. 1 is that this approach scales well to larger screen sizes. Since the emitters and detectors are positioned around the periphery, increasing the screen size by a linear factor of N means that the periphery also scales by a factor of N rather than $N^2$.

B. Process Overview

Figure 2:
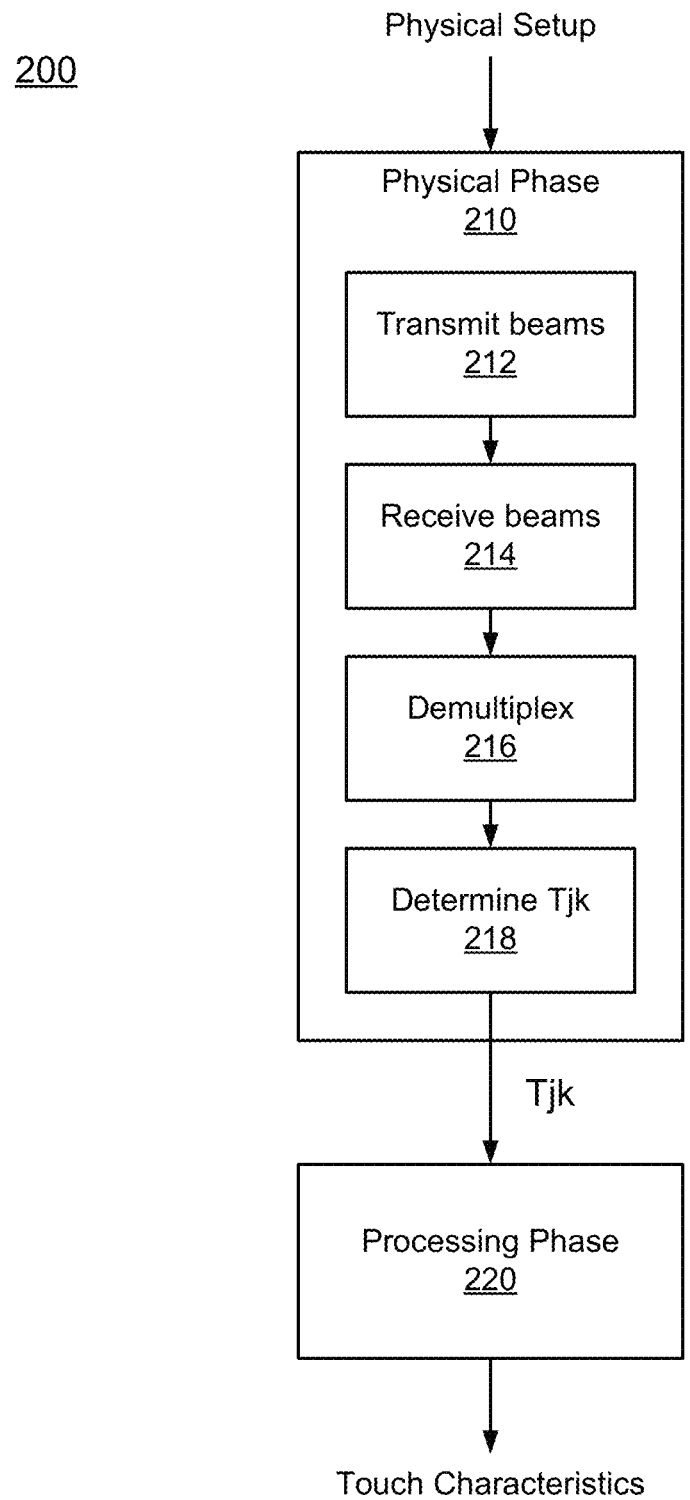
FIG. 2 is a flow diagram for determining the characteristics of touch events, according to one embodiment.

FIG. 2 is a flow diagram for determining the characteristics of touch events, according to an embodiment. This process will be illustrated using the device of FIG. 1. The process 200 is roughly divided into two phases, which will be referred to as a physical phase 210 and a processing phase 220. Conceptually, the dividing line between the two phases is a set of transmission coefficients Tjk.

The transmission coefficient Tjk is the transmittance of the optical beam from emitter j to detector k, compared to what would have been transmitted if there was no touch event interacting with the optical beam. In the following examples, we will use a scale of 0 (fully blocked beam) to 1 (fully transmitted beam). Thus, a beam jk that is undisturbed by a touch event has Tjk=1. A beam jk that is fully blocked by a touch event has a Tjk=0. A beam jk that is partially blocked or attenuated by a touch event has 0<Tjk<1. It is possible for Tjk>1, for example depending on the nature of the touch interaction or in cases where light is deflected or scattered to detectors k that it normally would not reach.

The use of this specific measure is purely an example. Other measures can be used. In particular, since we are most interested in interrupted beams, an inverse measure such as (1−Tjk) may be used since it is normally 0. Other examples include measures of absorption, attenuation, reflection, or scattering. In addition, although FIG. 2 is explained using Tjk as the dividing line between the physical phase 210 and the processing phase 220, it is not required that Tjk be expressly calculated. Nor is a clear division between the physical phase 210 and processing phase 220 required.

Returning to FIG. 2, the physical phase 210 is the process of determining the Tjk from the physical setup. The processing phase 220 determines the touch events from the Tjk. The model shown in FIG. 2 is conceptually useful because it somewhat separates the physical setup and underlying physical mechanisms from the subsequent processing.

For example, the physical phase 210 produces transmission coefficients Tjk. Many different physical designs for the touch-sensitive surface assembly 130 are possible, and different design tradeoffs will be considered depending on the end application. For example, the emitters and detectors may be narrower or wider, narrower angle or wider angle, various wavelengths, various powers, coherent or not, etc. As another example, different types of multiplexing may be used to allow beams from multiple emitters to be received by each detector. Several of these physical setups and manners of operation are described below, primarily in Section II.

The interior of block 210 shows one possible implementation of process 210. In this example, emitters transmit 212 beams to multiple detectors. Some of the beams travelling across the touch-sensitive surface are disturbed by touch events. The detectors receive 214 the beams from the emitters in a multiplexed optical form. The received beams are de-multiplexed 216 to distinguish individual beams jk from each other. Transmission coefficients Tjk for each individual beam jk are then determined 218.

The processing phase 220 computes the touch characteristics and can be implemented in many different ways. Candidate touch points, line imaging, location interpolation, touch event templates and multi-pass approaches are all examples of techniques that may be used to compute the touch characteristics (such as touch location and touch strength) as part of the processing phase 220. Several of these are described below, primarily in Section III.

II. Physical Set-Up

The touch-sensitive device 100 may be implemented in a number of different ways. The following are some examples of design variations.

A. Electronics

With respect to electronic aspects, note that FIG. 1 is exemplary and functional in nature. Functions from different boxes in FIG. 1 can be implemented together in the same component.

For example, the controller 110 and touch event processor 140 may be implemented as hardware, software or a combination of the two. They may also be implemented together (e.g., as an SoC with code running on a processor in the SoC) or separately (e.g., the controller as part of an ASIC, and the touch event processor as software running on a separate processor chip that communicates with the ASIC). Example implementations include dedicated hardware (e.g., ASIC or programmed field programmable gate array (FPGA)), and microprocessor or microcontroller (either embedded or standalone) running software code (including firmware). Software implementations can be modified after manufacturing by updating the software.

The emitter/detector drive circuits 120 serve as an interface between the controller 110 and the emitters and detectors. In one implementation, the interface to the controller 110 is at least partly digital in nature. With respect to emitters, the controller 110 may send commands controlling the operation of the emitters. These commands may be instructions, for example a sequence of bits which mean to take certain actions: start/stop transmission of beams, change to a certain pattern or sequence of beams, adjust power, power up/power down circuits. They may also be simpler signals, for example a "beam enable signal," where the emitters transmit beams when the beam enable signal is high and do not transmit when the beam enable signal is low.

The circuits 120 convert the received instructions into physical signals that drive the emitters. For example, circuit 120 might include some digital logic coupled to digital to analog converters, in order to convert received digital instructions into drive currents for the emitters. The circuit 120 might also include other circuitry used to operate the emitters: modulators to impress electrical modulations onto the optical beams (or onto the electrical signals driving the emitters), control loops and analog feedback from the emitters, for example. The emitters may also send information to the controller, for example providing signals that report on their current status.

With respect to the detectors, the controller 110 may also send commands controlling the operation of the detectors, and the detectors may return signals to the controller. The detectors also transmit information about the beams received by the detectors. For example, the circuits 120 may receive raw or amplified analog signals from the detectors. The circuits then may condition these signals (e.g., noise suppression), convert them from analog to digital form, and perhaps also apply some digital processing (e.g., demodulation).

B. Touch Interactions

Not all touch objects are equally good beam attenuators, as indicated by their transmission coefficient $T_{jk}$. Beam attenuation mainly depends on the volume of the object portion that is interacting with the beam, i.e. the object portion that intersects the beam propagation volume.

Figure 3:
FIG. 3 illustrates an example mechanism for a touch interaction with an optical beam, according to some embodiments.

FIG. 3 illustrates a mechanism for touch detection based on beam blockage. Emitters produce beams which are in close proximity to a surface 306. An object 304 coming into contact with the surface 306 will partially or entirely block beams within the contact area. The beam is illustrated as a thin line, describing a very thin beam (beam height is very small).

For simplicity, in the remainder of this description, the touch mechanism will be assumed to be primarily of a blocking nature, meaning that a beam from an emitter to a detector will be partially or fully blocked by an intervening touch event. This is not required, but it is convenient to illustrate various concepts.

For convenience, the touch interaction mechanism may sometimes be classified as either binary or analog. A binary interaction is one that basically has two possible responses as a function of the touch. Examples includes non-blocking and fully blocking, or non-blocking and 10%+ attenuation. An analog interaction is one that has a "grayscale" response to the touch: non-blocking passing through gradations of partially blocking to blocking. Whether the touch interaction mechanism is binary or analog depends in part on the nature of the interaction between the touch and the beam. It does depend on the lateral height of the beam (which can also be manipulated to obtain a binary or analog attenuation, as described below.

Figure 4A:
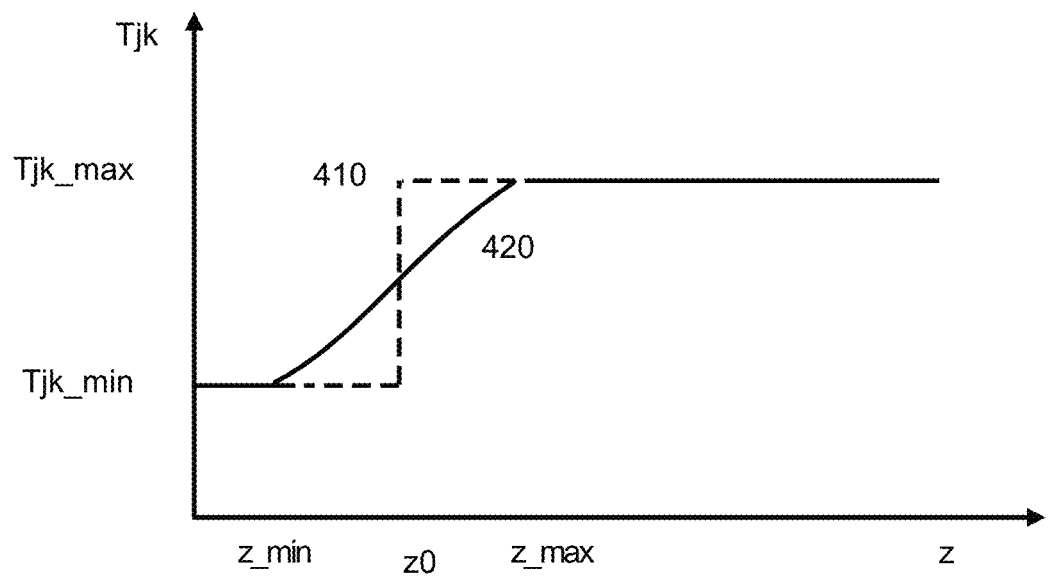
FIG. 4A is a graph of binary and analog touch interactions.

FIG. 4A is a graph illustrating a binary touch interaction mechanism compared to an analog touch interaction mechanism. FIG. 4A graphs the transmittance $T_{jk}$ as a function of the touch position on the z axis (normal to the active surface). The dimension z is 0 when the touch is barely in contact with the active surface and z increases as the touch gets more distant. Curve 410 is a binary response obtained when light is propagating mostly at a distance z0 to the surface (e.g. in case of a very thin beam). At high z (i.e., when the touch has not yet disturbed the beam), the transmittance $T_{jk}$ is at its maximum. However, at contact point z=z0, the touch breaks the beam and the transmittance $T_{jk}$ falls fairly suddenly to its minimum value. In some embodiments, the beam is not very thin and propagates over the surface within a volume. The beam propagates over the surface at distances ranging from z_min to z_max (where the z-axis is normal to the active surface). Typically, z_max is 1 to 2 mm, while z_min is typically maintained as close as possible to 0, typically from 0 to 0.5 mm. However, in other embodiments, other values of z_min and z_max may be used. Curve 420 shows an analog response where the transition from maximum $T_{jk}$ to minimum $T_{jk}$ occurs over a wider range of z.

Figure 4B:
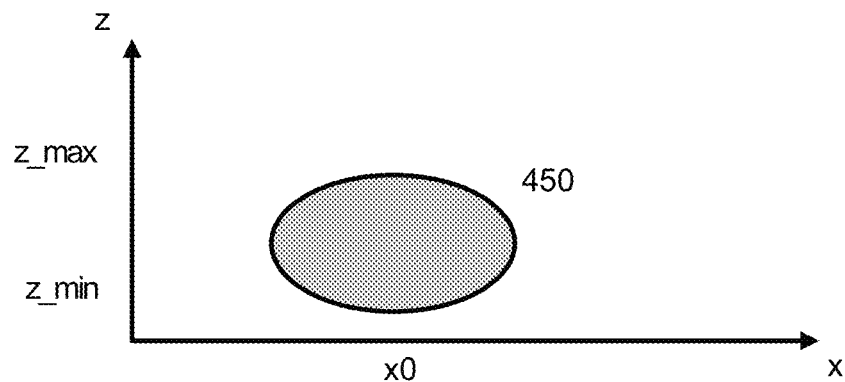

FIG. 4B illustrates a beam irradiance cross-section where the cross-section is applied in a plane perpendicular to the beam propagation direction. The propagation cross-section 450 (greyed) is defined as having a non-zero irradiance. This surface is centered at an x coordinate x0 and its z-component is confined between z_min and z_max. Conceptually, the propagation surface includes all rays travelling from an emitter to a detector. Given the emitter and detector directional pattern, each ray is representative of a possible propagation for possible emission and detection angles, which may be used in ray tracing applications (e.g., using Monte Carlo analysis).

FIGS. 4C-4D illustrate a stylus tip interacting with a beam. FIG. 4C is a top view of a beam footprint 460 and a cylindrical tip 470 positioned in the middle of the beam. Cross-section line AA crossing the middle of the tip and perpendicular to the beam propagation path is shown. FIG. 4D is the AA cross-section view of the beam and tip. For simplicity, consider a beam having elliptical cross-section with uniform light intensity and a cylindrical tip drawn as a rectangular surface (the cylinder cross-section). The tip is drawn as it enters into the beam, nearly up to half its height. For a tip relative position within the beam, the fraction of light energy that is masked by the tip can be estimated by dividing the intersection of tip surface and beam surface with the beam surface alone. The intersection 480 of tip surface 470 and beam surface 450 is marked as a hatched surface in FIG. 4D. In case of a larger overlap, more light is being masked, resulting in a lower transmittance $T_{jk}$. Working with beam and tip cross-section surfaces and evaluating their overlap provides a model of the touch interaction along the beam. More elaborate models include optical effects such as diffraction, and include non-uniform beam irradiance within the propagation surface 450. As the tip moves towards the active area (z coordinate decreases to 0), the overlap increases and the transmittance $T_{jq}$ decreases to the minimum transmittance, as was explained in FIG. 4A.

C. Emitters, Detectors and Couplers

Each emitter transmits light to a number of detectors. Usually, each emitter outputs light to more than one detector simultaneously. Similarly, each detector may receive light from a number of different emitters. The optical beams may be visible, infrared (IR) and/or ultraviolet light. The term "light" is meant to include all of these wavelengths and terms such as "optical" are to be interpreted accordingly.

Examples of the optical sources for the emitters include light emitting diodes (LEDs) and semiconductor lasers. IR sources can also be used. Modulation of optical beams can be achieved by directly modulating the optical source or by using an external modulator, for example a liquid crystal modulator or a deflected mirror modulator. Examples of sensor elements for the detector include charge coupled devices, photodiodes, photoresistors, phototransistors, and nonlinear all-optical detectors. Typically, the detectors output an electrical signal that is a function of the intensity of the received optical beam.

The emitters and detectors may also include optics and/or electronics in addition to the main optical source and sensor element. For example, optics can be used to couple between the emitter/detector and the desired beam path. Optics can also reshape or otherwise condition the beam produced by the emitter or accepted by the detector. These optics may include lenses, Fresnel lenses, mirrors, filters, non-imaging optics and other optical components.

In this disclosure, the optical paths are shown unfolded for clarity. Thus, sources, optical beams and sensors are shown as lying in one plane. In actual implementations, the sources and sensors typically do not lie in the same plane as the optical beams. Various coupling approaches can be used. For example, a planar waveguide or optical fiber may be used to couple light to/from the actual beam path. Free space coupling (e.g., lenses and mirrors) may also be used. A combination may also be used, for example waveguided along one dimension and free space along the other dimension. Various coupler designs are described in U.S. Pat. No. 9,170,683, entitled "Optical Coupler," which is incorporated by reference herein.

D. Optical Beam Paths

Figure 5A:
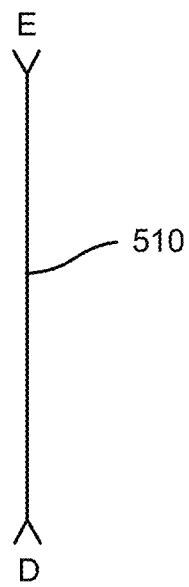
FIGS. 5A-5C are top views of differently shaped beam footprints.
Figure 5B:
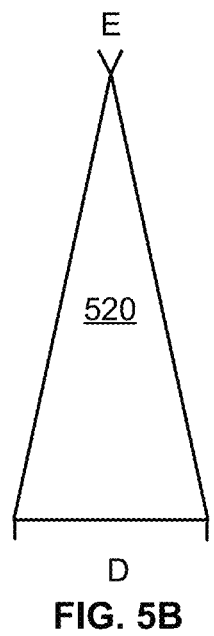
Figure 5C:
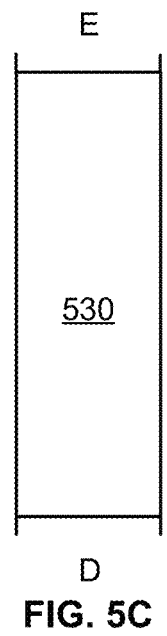

Another aspect of a touch-sensitive system is the shape and location of the optical beams and beam paths. In FIG. 1, the optical beams are shown as lines. These lines should be interpreted as representative of the beams, but the beams themselves are not necessarily narrow pencil beams. FIGS. 5A-5C illustrate different beam shapes when projected onto the active surface (beam footprint).

FIG. 5A shows a point emitter E, point detector D and a narrow "pencil" beam 510 from the emitter to the detector. In FIG. 5B, a point emitter E produces a fan-shaped beam 520 received by the wide detector D. In FIG. 5C, a wide emitter E produces a "rectangular" beam 530 received by the wide detector D. These are top views of the beams and the shapes shown are the footprints of the beam paths. Thus, beam 510 has a line-like footprint, beam 520 has a triangular footprint which is narrow at the emitter and wide at the detector, and beam 530 has a fairly constant width rectangular footprint. In FIG. 5, the detectors and emitters are represented by their widths, as seen by the beam path. The actual optical sources and sensors may not be so wide. Rather, optics (e.g., cylindrical lenses or mirrors) can be used to effectively widen or narrow the lateral extent of the actual sources and sensors.

Figure 6A:
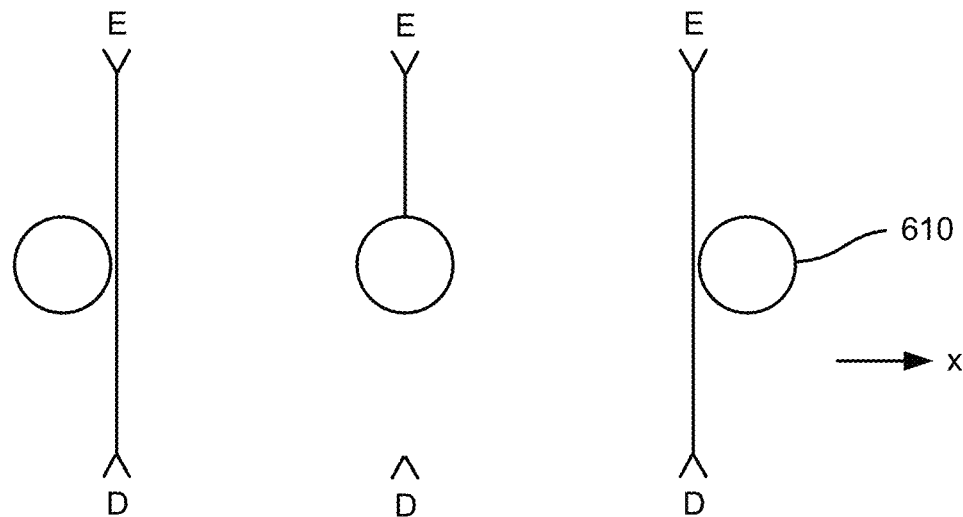
FIGS. 6A-6B are top views illustrating a touch point travelling through a narrow beam and a wide beam, respectively.
Figure 6B:
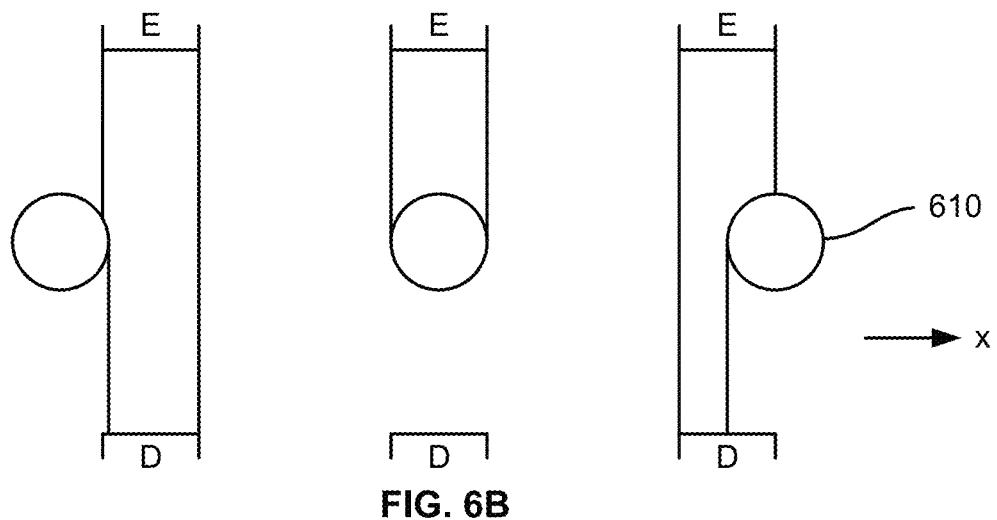
Figure 7:
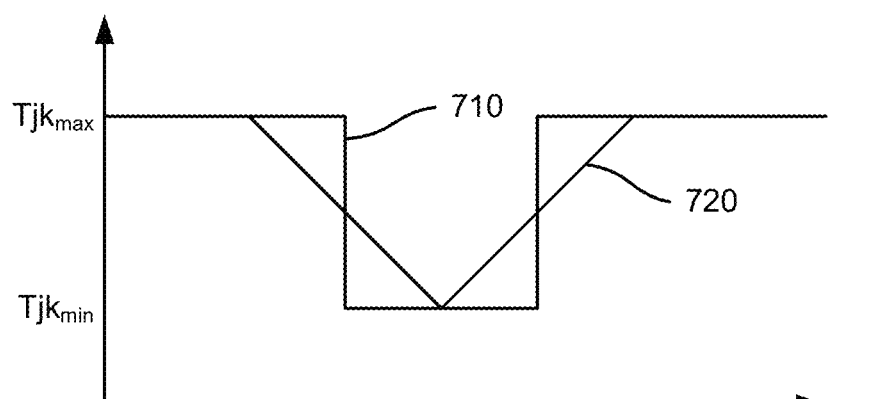
FIG. 7 is a graph of the binary and analog responses for the narrow and wide beams of FIG. 6.

FIGS. 6A-6B and 7 show, for a constant z position and various x positions, how the width of the footprint can determine whether the transmission coefficient Tjk behaves as a binary or analog quantity. In these figures, a touch point has contact area 610. Assume that the touch is fully blocking, so that any light that hits contact area 610 will be blocked. FIG. 6A shows what happens as the touch point moves left to right past a narrow beam. In the leftmost situation, the beam is not blocked at all (i.e., maximum Tjk) until the right edge of the contact area 610 interrupts the beam. At this point, the beam is fully blocked (i.e., minimum Tjk), as is also the case in the middle scenario. It continues as fully blocked until the entire contact area moves through the beam. Then, the beam is again fully unblocked, as shown in the righthand scenario. Curve 710 in FIG. 7 shows the transmittance Tjk as a function of the lateral position x of the contact area 610. The sharp transitions between minimum and maximum Tjk show the binary nature of this response.

FIG. 6B shows what happens as the touch point moves left to right past a wide beam. In the leftmost scenario, the beam is just starting to be blocked. The transmittance Tjk starts to fall off but is at some value between the minimum and maximum values. The transmittance Tjk continues to fall as the touch point blocks more of the beam, until the middle situation where the beam is fully blocked. Then the transmittance Tjk starts to increase again as the contact area exits the beam, as shown in the righthand situation. Curve 720 in FIG. 7 shows the transmittance Tjk as a function of the lateral position x of the contact area 610. The transition over a broad range of x shows the analog nature of this response.

E. Multiplexing

Since multiple emitters transmit multiple optical beams to multiple detectors, and since the behavior of individual beams is generally desired, a multiplexing/demultiplexing scheme is used. For example, each detector typically outputs a single electrical signal indicative of the intensity of the incident light, regardless of whether that light is from one optical beam produced by one emitter or from many optical beams produced by many emitters. However, the transmittance Tjk is a characteristic of an individual optical beam jk.

Different types of multiplexing can be used. Depending upon the multiplexing scheme used, the transmission characteristics of beams, including their content and when they are transmitted, may vary. Consequently, the choice of multiplexing scheme may affect both the physical construction of the optical touch-sensitive device as well as its operation.

One approach is based on code division multiplexing. In this approach, the optical beams produced by each emitter are encoded using different codes. A detector receives an optical signal which is the combination of optical beams from different emitters, but the received beam can be separated into its components based on the codes. This is described in further detail in U.S. Pat. No. 8,227,742, entitled "Optical Control System With Modulated Emitters," which is incorporated by reference herein.

Another similar approach is frequency division multiplexing. In this approach, rather than modulated by different codes, the optical beams from different emitters are modulated by different frequencies. The frequencies are low enough that the different components in the detected optical beam can be recovered by electronic filtering or other electronic or software means.

Time division multiplexing can also be used. In this approach, different emitters transmit beams at different times. The optical beams and transmission coefficients Tjk are identified based on timing. If only time multiplexing is used, the controller cycles through the emitters quickly enough to meet a specified touch sampling rate.

Other multiplexing techniques commonly used with optical systems include wavelength division multiplexing, polarization multiplexing, spatial multiplexing and angle multiplexing. Electronic modulation schemes, such as PSK, QAM and OFDM, may also be possibly applied to distinguish different beams.

Several multiplexing techniques may be used together. For example, time division multiplexing and code division multiplexing could be combined. Rather than code division multiplexing 128 emitters or time division multiplexing 128 emitters, the emitters might be broken down into 8 groups of 16. The 8 groups are time division multiplexed so that only 16 emitters are operating at any one time, and those 16 emitters are code division multiplexed. This might be advantageous, for example, to minimize the number of emitters active at any given point in time to reduce the power requirements of the device.

F. Compliant Stylus

A compliant stylus disturbs beams by a variable amount that is dependent on the amount of force applied to the stylus towards the surface. In some embodiments, the beam disturbance is proportional to the amount of force applied to the stylus. Other embodiments have more complex relationships between force and attenuation. Generally, a user applies a force to a stylus along a central axis of the stylus. A central axis of the stylus may be substantially parallel (e.g., within five degrees) to the force measured or experienced by the stylus. Typically, a user holds a stylus at an incline with respect to the normal of the surface. For example, the central axis of a stylus is inclined by up to 45 degrees (for writing) or 60 degrees (for sketching) from the normal of the surface. An example compliant stylus includes a tip that can retreat into the stylus body. Thus, pushing the stylus harder on the active area makes the tip to retreat into the stylus body. When the tip retreats within the body, the stylus volume affecting the beam attenuation is increased.

Writing or otherwise contacting the touch surface with a compliant stylus allows for the determination of the touch strength (also referred to as the strength characteristic). Touch strength is determined by the controller and is a measure of the amount of force applied on the stylus towards the surface. Specifically, touch strength is a variable representing the applied force for a touch event. Touch strength may be directly mapped to the applied force (e.g., touch strength is described in newtons), however touch strength may have a more complex mapping (e.g., a non-linear relationship) with the applied force. Touch strength can be used as an indicator of the intensity of an interaction with the touch screen, and the strength characteristic of a touch event can be changed without changing the touch position on the touch screen. A program rendering annotations in a host computer may use the touch strength of a touch event to emulate various annotation effects, such as visualizing the annotation with wider lines or visualizing it with more opaque or darker colors. Thus, user experience is improved for systems in which the strength characteristic is determined. For example, in a drawing application, ink transparency, as drawn by the host computer, may be reduced (making the drawn line darker when the touch strength is larger) as if more ink was flowing out of the stylus. Additionally or alternatively, the drawn line may have an increased width for larger strengths. Using the strength characteristic also offers benefits when used with other object types. An eraser object, for example, could erase a larger area on the display in response to greater force applied by the user. In another example, some on-screen objects may be erased by light contact force while other 'stubborn' on-screen objects may be designed to require a higher applied force to be erased.

Figure 8A:
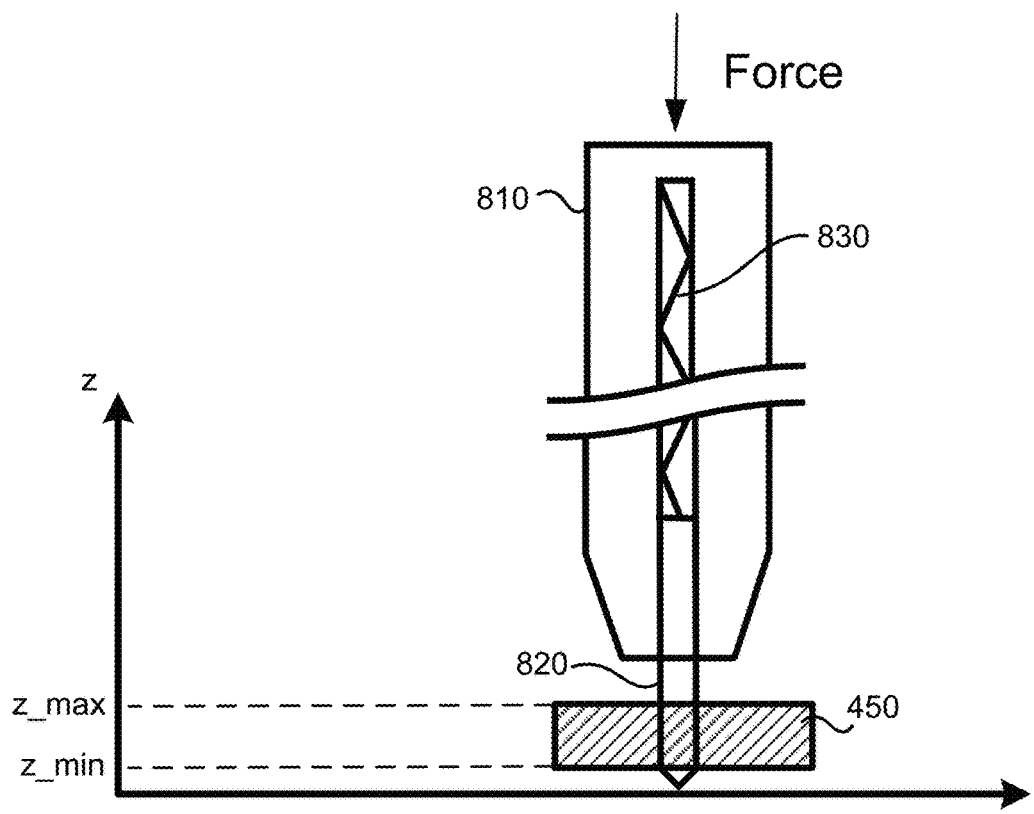
FIGS. 8A-8B are cross-sections of a tapered compliant stylus disturbing an optical beam, according to some embodiments.
Figure 8B:
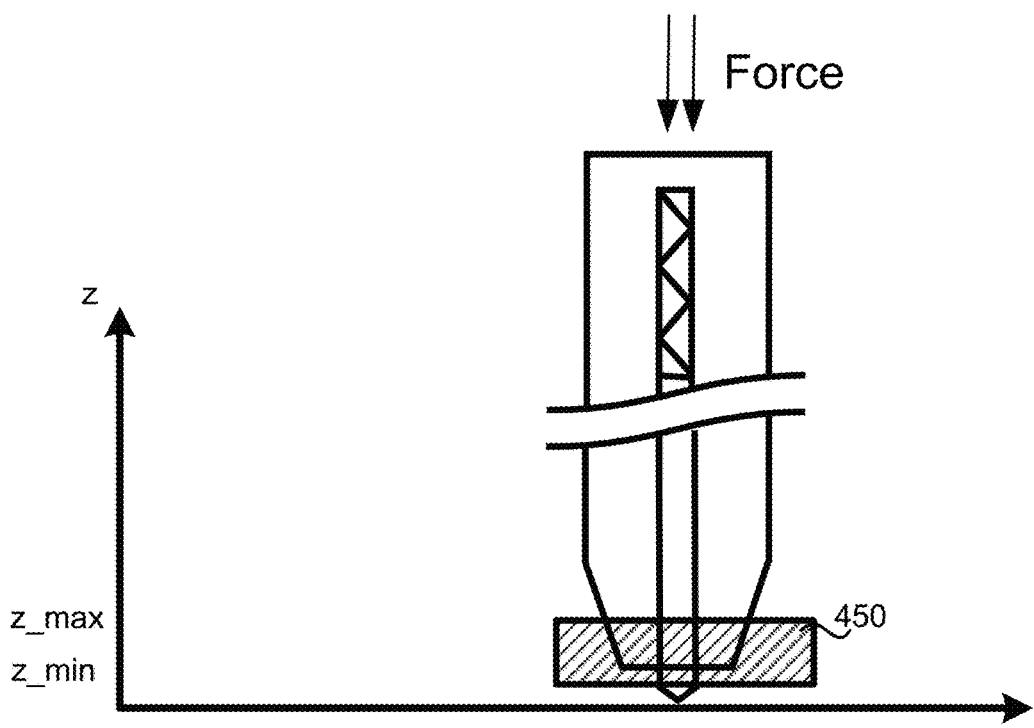

FIGS. 8A-8B are cross-sections of a tapered compliant stylus disturbing an optical beam, according to some embodiments. Specifically, the stylus is interacting with a beam 450 having z support (distance along the surface normal) between z_min and z_max. The stylus body 810 has a central axis that is substantially parallel to the force measured by or experienced by the stylus when the stylus is in contact with the surface. The stylus body 810 has a longitudinal cylindrical cavity into which a compression spring 830 of matching diameter is inserted. The stylus tip 820 is a rigid circular cylinder of same diameter, and is inserted into the same cavity on top of the spring 830. The body 810 slides parallel to the central axis and along the tip 810. When the stylus body 810 is pushed against a surface in contact with the tip 820, the tip 820 slides in the cavity as the spring 830 compresses according to the spring force-compression characteristics. The larger the force, the larger the tip 820 slides into the cavity. In some embodiments, the spring 830 is replace by a different component with similar properties compression and extension properties, such as an elastic material.

FIG. 8A shows a situation where a low force is applied on the stylus. The pen tip 820 protrudes out of the stylus body 810 by more than z_max and contacts the active area. As a result, only the tip 820 interacts with the beam section 450. Thus, beam transmittance is reduced from Tjk_max to Tjk_A. Indices j and k are respectively the emitter index, and the detector index, used to produce beam 450. The transmittance reduction is large enough to enable proper detection and position calculation, but the transmittance reduction is rather small given the tip width compared to the beam width.

FIG. 8B shows a situation where a larger force is applied on the stylus, according to an embodiment. The spring 830 is compressed and the pen tip 820 protrudes out of the stylus body 820 by less than z_max. As a result, the stylus body 810 also interacts with the beam section 450. Beam transmittance is reduced from Tjk_max to Tjk_B, where Tjk_B<Tjk_A. The stylus body 810 is tapered toward the writing-end so that increasing the force results in a larger beam interaction (since a larger volume is interacting) and consequently, results in a smaller transmittance Tjk. This is achieved in one embodiment by making the stylus body-end to be shaped like a truncated cone. Other tapering shapes at the writing-end of the stylus body 810 can be designed to tailor the transmittance sensitivity to a force increase.

Figure 9C:
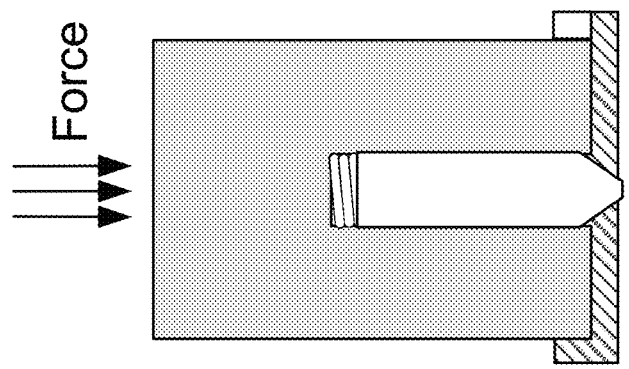
FIGS. 9A-9C are cross-sections of a compliant stylus with no taper disturbing an optical beam, according to some embodiments.
Figure 9B:
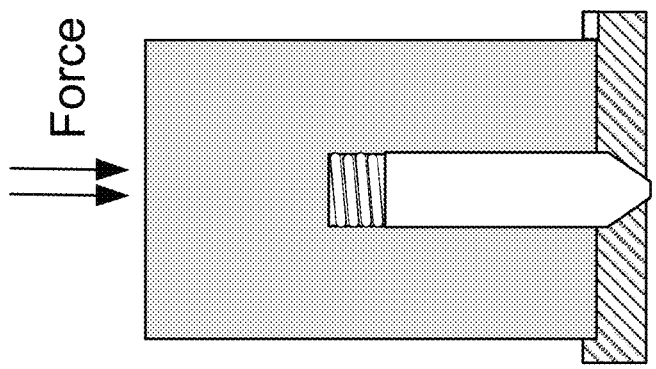
Figure 9A:
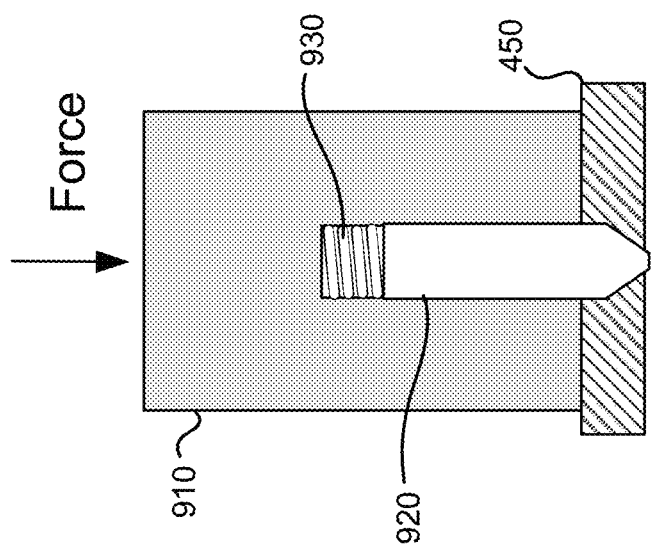

FIGS. 9A-9C are cross-sections of another compliant stylus with disturbing an optical beam, according to some embodiments. Specifically, FIGS. 9A-9C illustrate an alternative embodiment in which the stylus body 910 is not tapered. For example, the body is a right circular cylinder. When the force applied to the body 910 gets larger, the body 910 progressively interacts with the beam section 450, starting with no interaction at low force (FIG. 9A), all the way to a max interaction when the spring 930 is fully compressed (FIG. 9C). For an intermediate force (FIG. 9B), beam transmittance is reduced from Tjk_max to Tjk_C, while it is reduced to Tjk_D for the fully compressed force (FIG. 9C), where Tjk_D<Tjk_C. Thus, the stylus disturbs the beams by an amount dependent on the amount of force applied to the stylus towards the surface.

Although the tip 920 is a rigid material in FIGS. 9A-9C, in alternative embodiments the tip 920 is made of compliant material such as rubber or elastomeric material. In this case, the spring 930 may be omitted since the tip itself is compliant. Applying a larger force on the stylus body 910 results in the tip sliding inside the stylus body 910 with the same effect as with the compression spring 930.

Figure 10A:
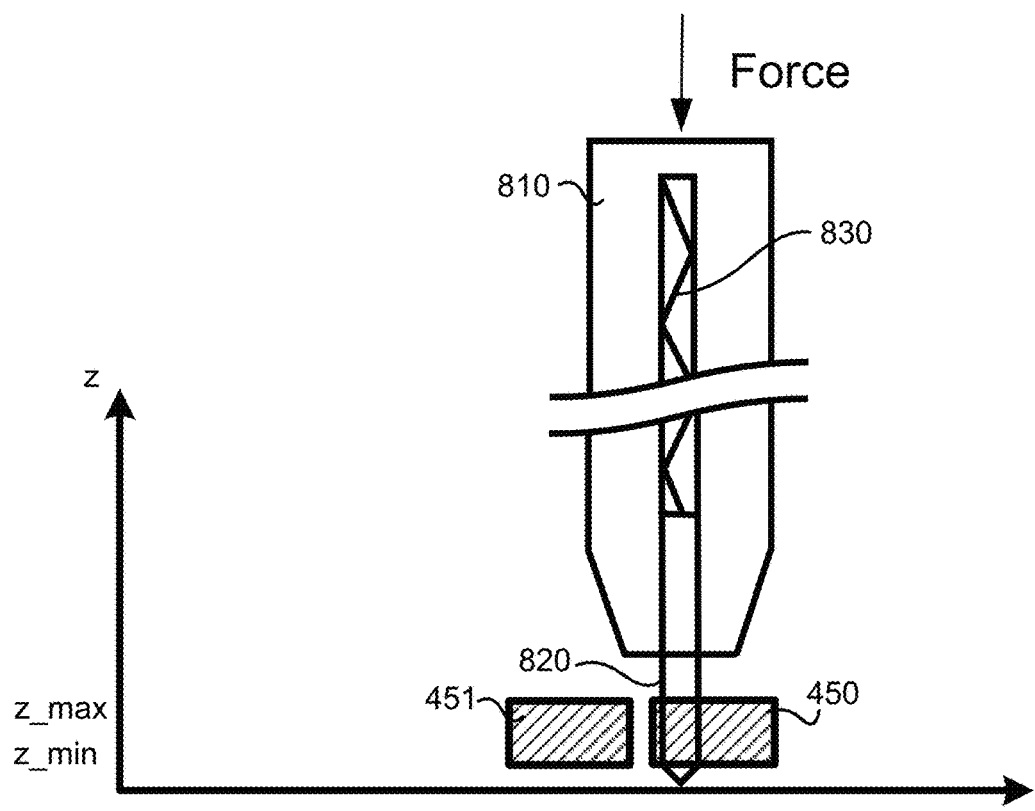
FIGS. 10A-10B are cross-sections of a compliant stylus disturbing different populations of beams in response to variations in applied force, according to some embodiments.
Figure 10B:
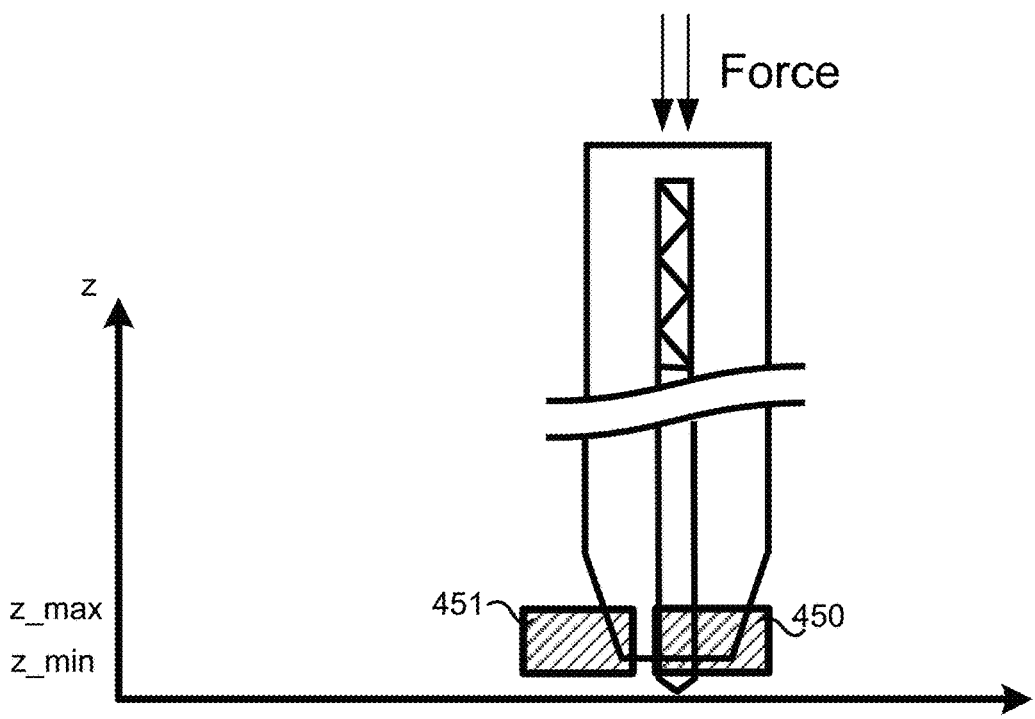

FIGS. 10A-10B are cross-sections of a compliant stylus disturbing different populations of beams in response to variations in applied force, according to some embodiments.

In FIGS. 10A and 10B, the stylus body 810 is wide enough to disturb beams 450 and 451. Beams 450 and 451 are two parallel beam sections with no overlap. Although not illustrated, other beam configurations (e.g., crossing or overlapping beams) can also be considered. In FIG. 10A, a low force is applied to the stylus body 810. As a result, the stylus tip 820 disturbs beam 450 and the beam transmittance thus is reduced from Tjk_max to Tjk_A. Beam 451 is not disturbed by the stylus. As a result, the transmittance of beam 451 (e.g., Tmn) is maintained at its maximum value (e.g., Tmn_max).

In FIG. 10B, a larger force is applied. As a result, the stylus body 810 interacts with beam 450, and a reduced transmittance Tjk_B is measured, where Tjk_B<Tjk_A. As drawn, the stylus body 810 also interacts with beam 451 due to the larger applied force. Thus, the transmittance of beam 451 is reduced (e.g., from Tmn_max to Tmn_E). This can result in the processing phase 220 determining a higher strength value associated with the touch point of the stylus.

Figure 11C:
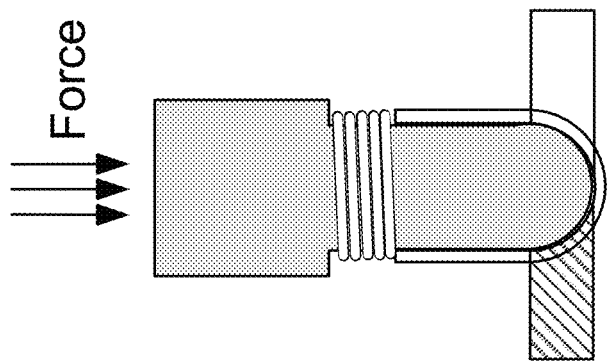
FIGS. 11A-11C are cross-sections of a compliant stylus with an internal plunger progressively blocking more of an optical beam as applied force is increased, according to some embodiments.
Figure 11B:
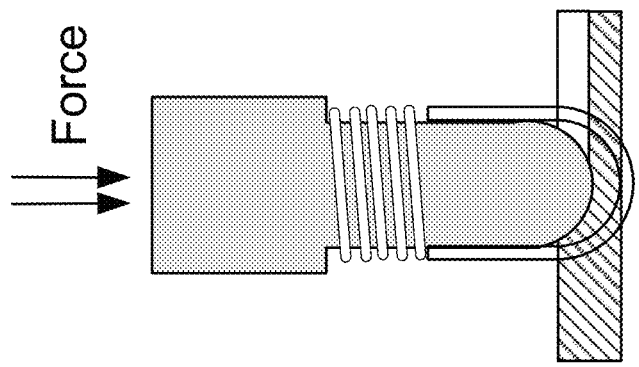
Figure 11A:
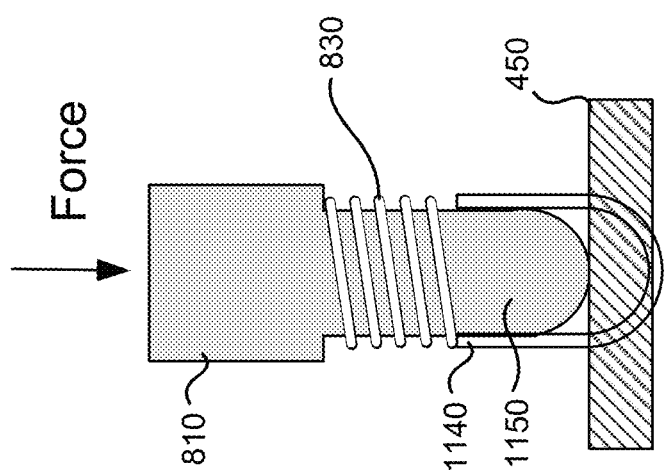

FIGS. 11A-11C are cross-sections of a compliant stylus with an internal plunger 1150 progressively blocking more of an optical beam 450 as applied force is increased, according to some embodiments. Specifically, the tip includes a transparent (or at least partially transparent) envelope 1140 and a blocking plunger 1150. The blocking plunger 1150 is opaque to optical beams and can be considered an end portion of the stylus body 810. The envelop 1140 surrounds the blocking plunder 1150 and is configured to slide along the blocking plunger 1150. If the envelop 1140 is made of opaque material, the envelope 1140 may be perforated to provide partial transparency.

In FIG. 11A, the envelope 1140 interacts with beam 450 resulting in a small transmittance reduction since the light can propagate through the envelop 1140. The light-blocking plunger 1150 can slide within the envelope 1140 when a force is applied to the stylus towards the surface. A compression spring 830 or other resistive mechanism can push the plunger 1150 away from the envelope 1140 when the force is reduced. In FIG. 11A, the plunger 1150 is not disturbing beam 450. In FIG. 11B, a larger force is applied to the stylus body 810, and the blocking plunger 1150 interacts with beam 450. As a result, beam transmittance is reduced from Tjk_max to Tjk_F. In FIG. 11C, an even larger force is applied, and a reduced (or null) transmittance Tjk_G is measured, where Tjk_G<Tjk_F.

Figure 12C:
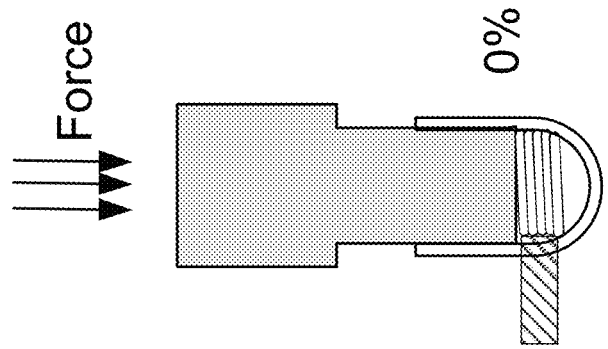
FIGS. 12A-12C are cross-sections of a compliant stylus with a compression spring as the occluding device, according to some embodiments.
Figure 12B:
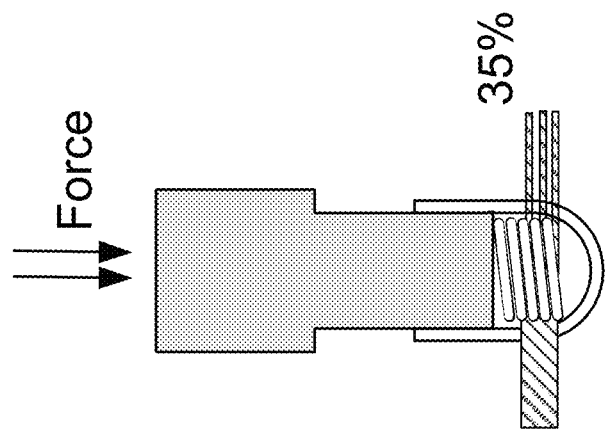
Figure 12A:
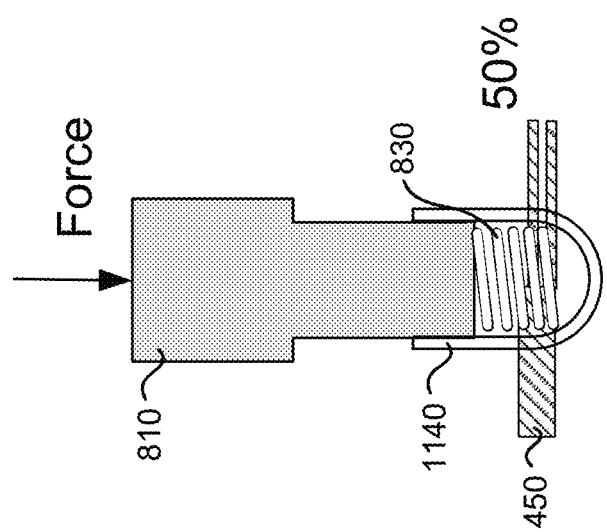

FIGS. 12A-12C are cross-sections of a compliant stylus with a compression spring 830 as the occluding device, according to some embodiments. The spring 830 is connected to an end of the stylus body 810 and is orientated to compress along a direction parallel to a central axis of the stylus body 810. The stylus includes an envelope 1140 connected to and surrounding the spring 830. The envelope 1140 is at least partially transparent to beam 450. The spring 830 may be instead of, or in addition to, a spring element that provides an opposition force to a contact force applied to the stylus when the stylus is in contact with the surface. With the spring 830 in the optical path, the proportion of light transmitted through the spring coil is reduced as the spring 830 becomes more compressed.

In FIG. 12A, the spring 830 is moderately compressed by a small pushing force so, for example, 50% of the light passes through. In FIG. 12B, the space between the spring windings is reduced, due to a larger applied force, so there is increased occlusion of the beam 450, for example, to 35% transmission. FIG. 12C illustrates an even larger applied force fully compressing the spring 830. Thus, for example, no light passes through the fully compressed spring 830.

Figures 13A, 13B, 13C:
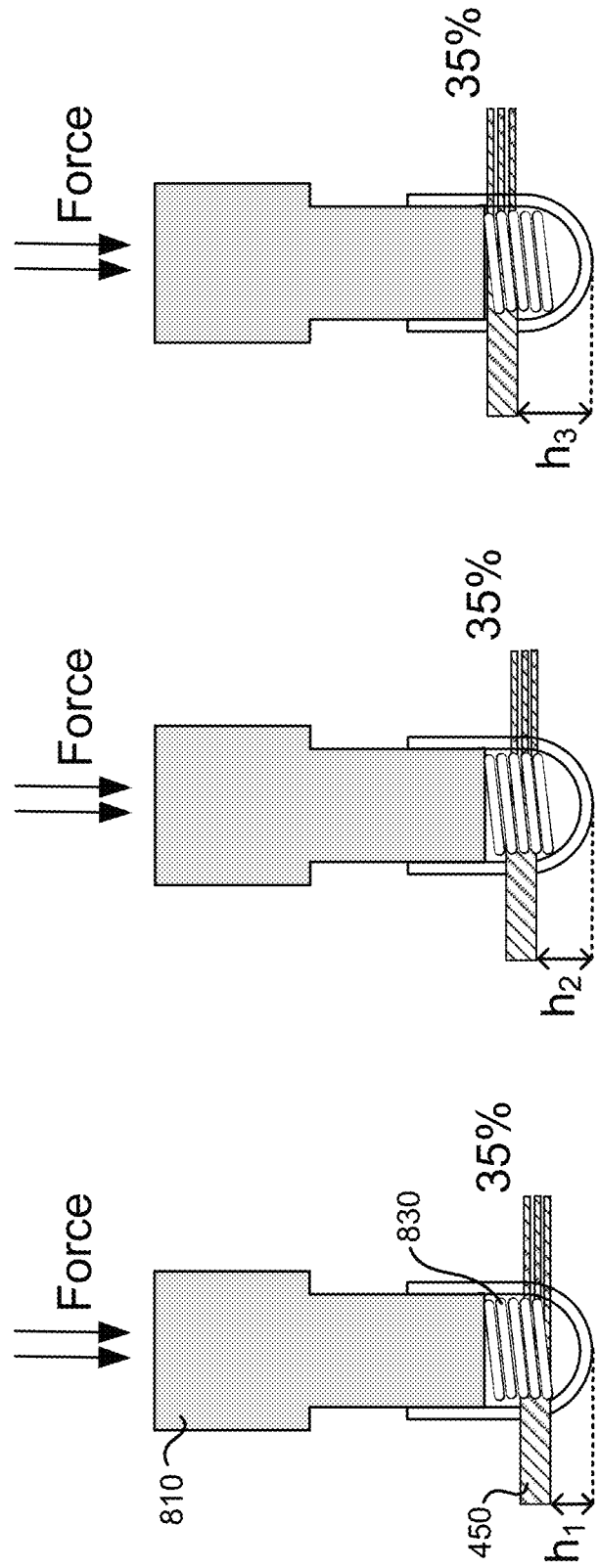
FIGS. 13A-13C illustrate the uniformity of occlusion for a spring with low, medium, and high elevations of sensing optical beams, according to some embodiments.

An additional advantage of this embodiment is that the optical attenuation can be substantially consistent for different beam heights relative to the contact surface. If the contact surface is warped, there may be variation in the part of the pen that is illuminated by the sensing beam light when the tip is in contact with the surface. FIGS. 13A-13C illustrate the relative uniformity of occlusion for a spring 830 with low, medium, and high elevations of sensing optical beams, according to some embodiments. Specifically, FIGS. 13A-13C show how differing beam heights do not cause a significant change in the force-related attenuation generated by the pen tip. This is due to the ratio of the occluding spring wire to transmissive space between the coils being approximately constant at all parts of the spring 830. The beam heights from the surface for FIGS. 13A-13C are respectively $h_1$, $h_2$, and $h_3$, where $h_1<h_2<h_3$. In the example figures, regardless of beam height, 35% of the beam passes through the transmissive space between the coils since the applied force is the same in each figure.

Another stylus embodiment which may offer the advantage of insensitivity to the distance between beam height and contact surface is shown in FIGS. 14A-14F. FIGS. 14A-14F illustrate front and side views of gratings or grills which progressively occlude beams as applied force is increased, according to some embodiments. The stylus includes a stylus tip with a top grating 1410 and a bottom grating 1420. The two gratings move relative to one another when a force is applied substantially parallel (e.g., within five degrees) to a central axis of the stylus. The gratings are aligned such that the beam attenuation through them rises or falls in response to one or both of the gratings being displaced. One or both of the gradings can be connected to the stylus body 810. A separate spring 830 may be used to oppose the applied force. The stylus may include an envelope 1140 that surrounds the gratings 1410, 1420. The envelope 1140 may be connected to one or both of the gratings and is configured to slide along the stylus body 810 in a direction parallel to the central axis of the stylus.

FIG. 14A shows a side view of two aligned gratings 1410, 1420 at a tip of a stylus. A small (or null) force is applied to the stylus and the aligned gratings attenuate an incident beam 450 (e.g., by 50%). FIG. 14B shows a front view of the aligned gratings 1410, 1420. FIG. 14C and FIG. 14D show the same views of the stylus for an increased applied force. Due to the increased force, the gratings are slightly misaligned, thereby increasing the attenuation of the incident beam 450 (e.g., to 25%). FIG. 14E and FIG. 14F show the same views of the stylus with a higher applied force. Due to the increased force, the gratings are fully offset so that no (or very little) light from beam 450 is transmitted through the gratings 1410, 1420.

Since the beam transmission through the grating pair can range from maximum to minimum over the height of the grating features, the force-induced movement of the gratings can be relatively small for a large attenuation response. In some embodiments, the vertical spacing between apertures is the same as the aperture height. Thus, the aperture height may be the mechanical travel of the stylus to explore the full range of available attenuation. For example, apertures of 0.1 mm to 2 mm in height are typical for mechanically originated (e.g., stamped, cast, machined, etched, or laser-cut) gratings. Fine gratings (such as diffraction gratings) can have line spacings of <1 micrometre (μm), so they offer the possibility of very short-travel force indication. In these embodiments, due to the short travel distances, a compliant substance such as an elastomer may be more appropriate than a spring. With this design, two identical gratings aligned provide 50% transmission through the grating pair, and a small movement in response to an applied force against the contact surface results in the two gratings being offset, giving a smaller open space for light to pass.

Figure 15A:
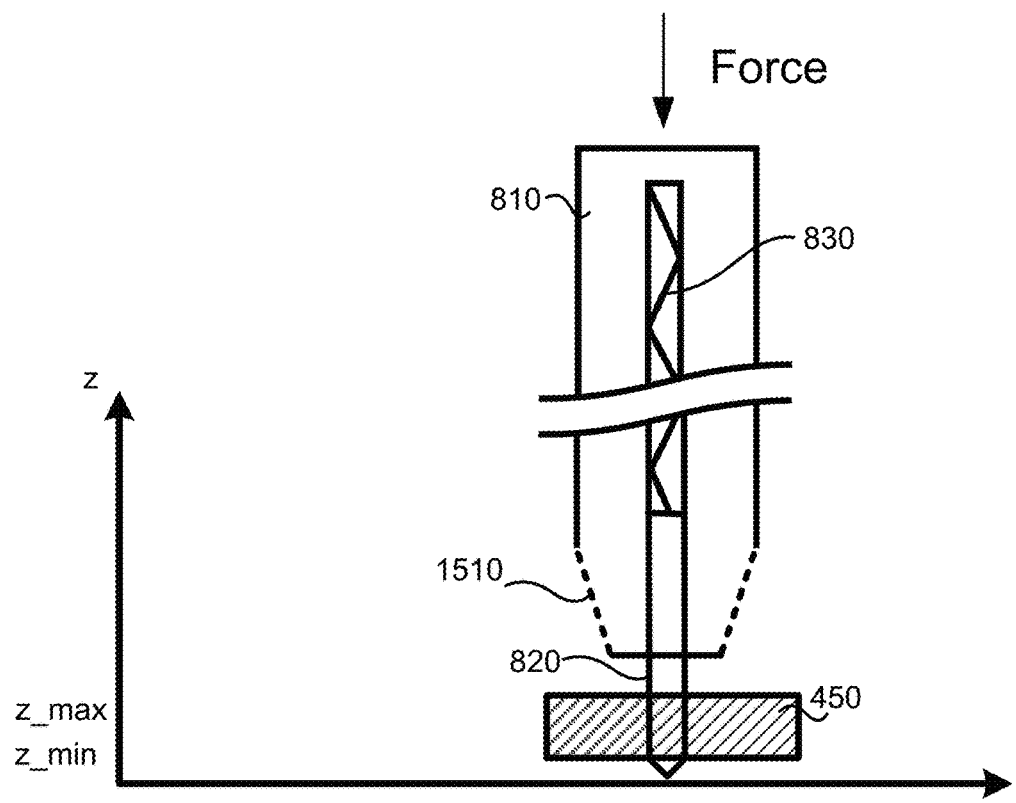
FIGS. 15A-15B are cross-sections of a compliant stylus with a reflective area on the stylus body, according to some embodiments.
Figure 15B:
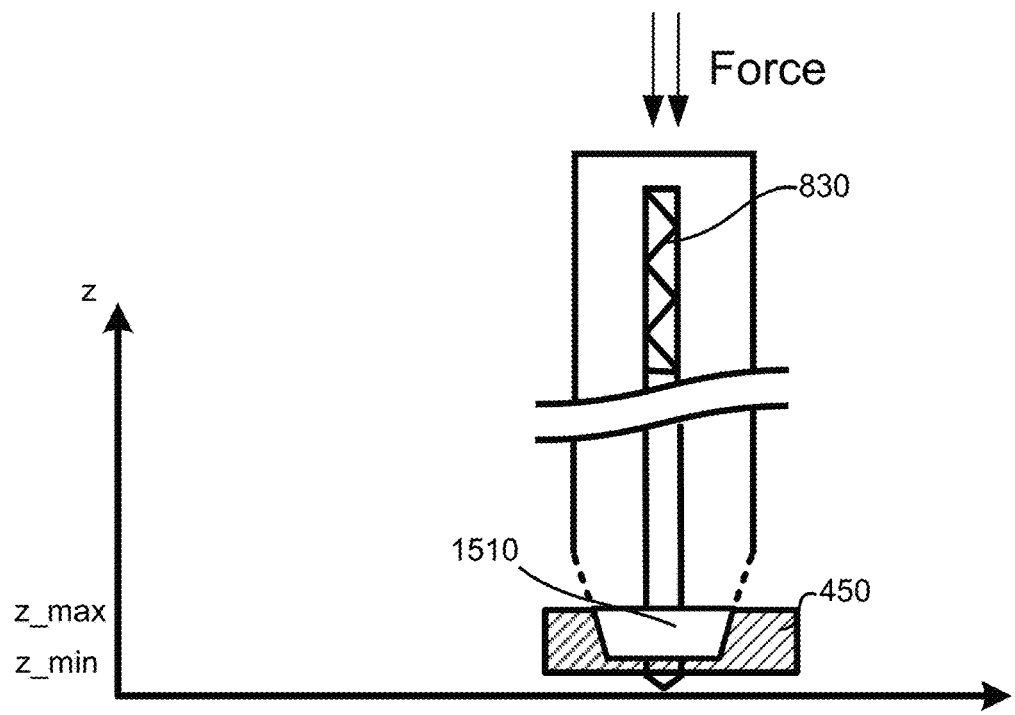

FIGS. 15A-15B are cross-sections of a compliant stylus with a reflective area on the stylus body, according to some embodiments. Specifically, the stylus writing-end is covered with reflective material 1510. The reflective material 1510 reflects light incident on the surface of the material. The reflective material 1510 may be a retro-reflective material that reflects light back to its source. The writing-end shape is tapered, but a cylindrical writing-end shape can be used as well. In FIG. 15A, a low force is applied and only the stylus tip 820 disturbs beam 450, resulting in a decreased transmittance for beam 450. In FIG. 15B, a larger force is applied and the writing-end of stylus body 810 also disturbs beam 450. This results in a larger transmittance reduction compared to FIG. 15A. Due to the reflective material 1510, the stylus body 810 reflects light from beam 450. While the transmittance of beam 450 (e.g., Tjk) is further reduced due to the larger fraction of light blocked from the stylus body 810, other beams (e.g., beam jl) may have increased transmittance values due to the back-reflected light. Beams with increasing transmittance may include beams with detectors located close to the emitter of the reflected beam. For example, back-reflected light from emitter j is confined within a reflection cone originating on the reflective surface of the stylus, and the back-reflected light impacts detectors close to emitter j. With a reflective compliant stylus, interaction strength can be coupled with beam energy enhancement (transmittance increases due to back-reflection), as opposed to beam energy attenuation (transmittance decreases due to light blocking) with a non-reflective stylus.

Figure 16:
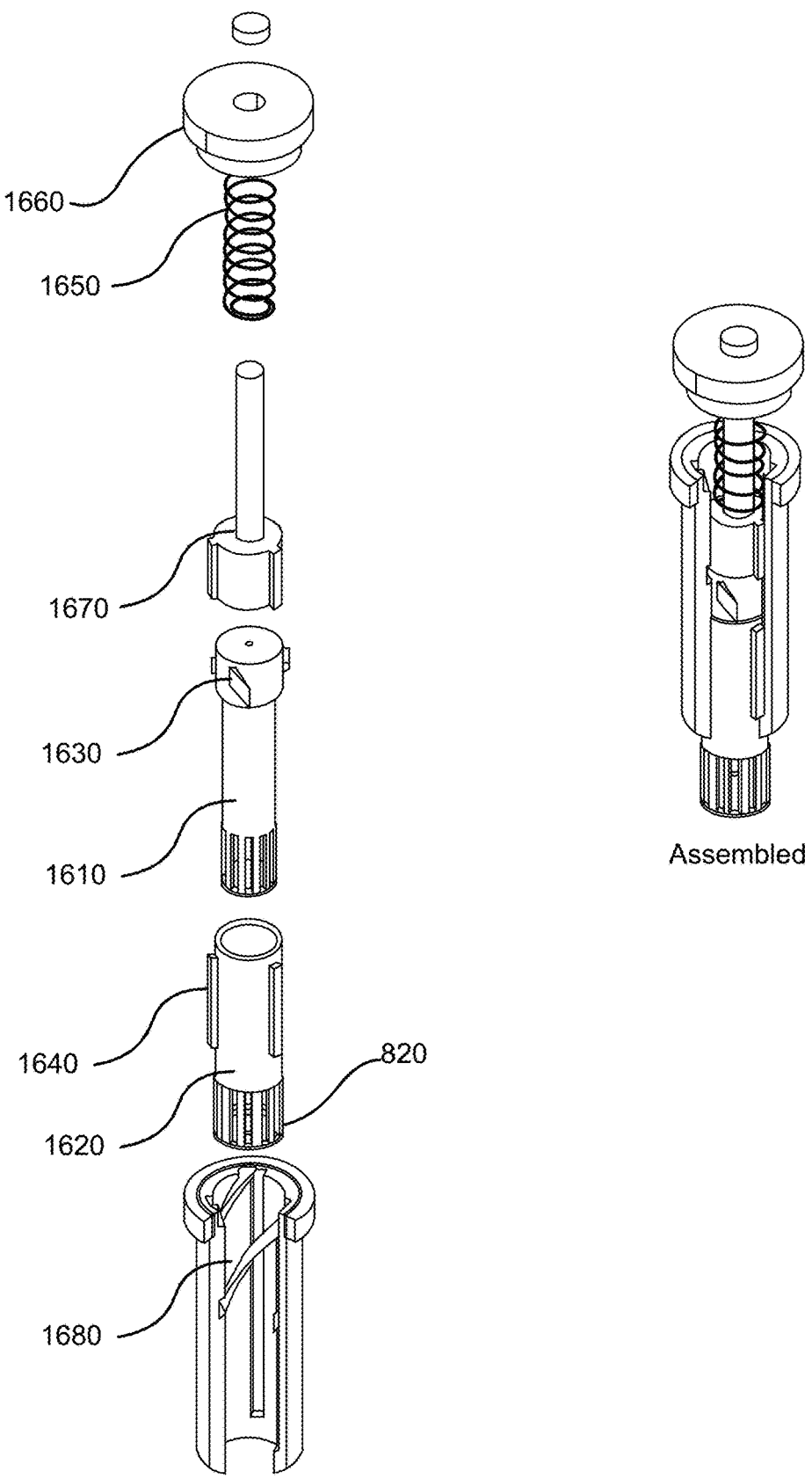
FIG. 16 is an exploded view of a compliant stylus with a rotating element in the tip which modulates the amount of sensing light passing through the tip as a function of applied force, according to an embodiment.

FIG. 16 is an exploded view of a compliant stylus with a rotating element which modulates the amount of sensing light passing through the tip as a function of applied force, according to an embodiment. The stylus includes a rotating grill 1610 inside another grill 1620 (note that 'grill' is synonymous with 'grating'). The rotating grill 1610 rotates inside the sliding grill 1620 when the assembly moves up and down in response to an applied force. When assembled, inclined guides 1630 follow helical slots inside a slide casing 1680 and linear guides 1640 follow linear slots inside the slide casing 1680. The tip 820 is located at an end of sliding grill 1620 and moves up and down. As the sliding grill 1620 moves up and down, the rotating grill 1610 turns relative to the sliding grill 1620. Rotating the rotating grill 1610 results in varying aperture widths between the concentric grill features. A restoring force is applied to grills 1610 and 1620 from spring 1650 through a spring slider 1670. The other end of the spring is fixed in position by a spring end cap 1660 which does not move relative to slide casing 1680. In some embodiments, the grills are referred to as gratings.

Figure 17:
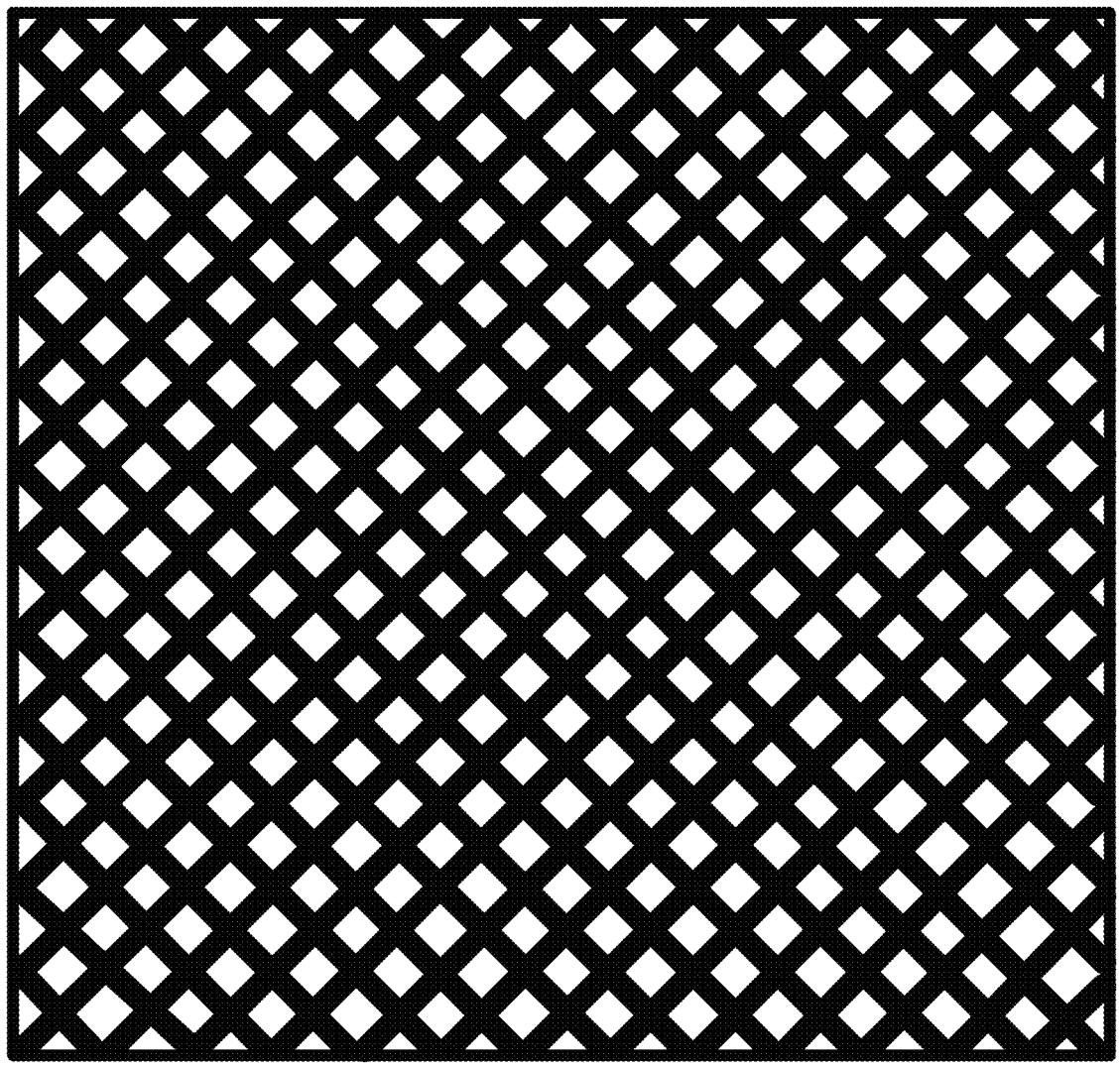
FIG. 17 illustrates a grating suitable for use in conjunction with another grating to variably occlude optical beams when the gratings are moved relative to one another, according to an embodiment.

FIG. 17 illustrates a grating, according to an embodiment. The grating is suitable for use in front of another grating such that the combined apertures for light passage through the apertures changes when a grating moves relative to the other grating. Movement of one grating relative to another in response to an applied force can be accomplished using methods and apparatuses exemplified in FIGS. 14A-14F and FIG. 16. Note that the grating need not be planar and may be formed into a full or partial polyhedral tube or cylinder, for example, to enhance the mechanical strength of the assembly.

Figure 18B:
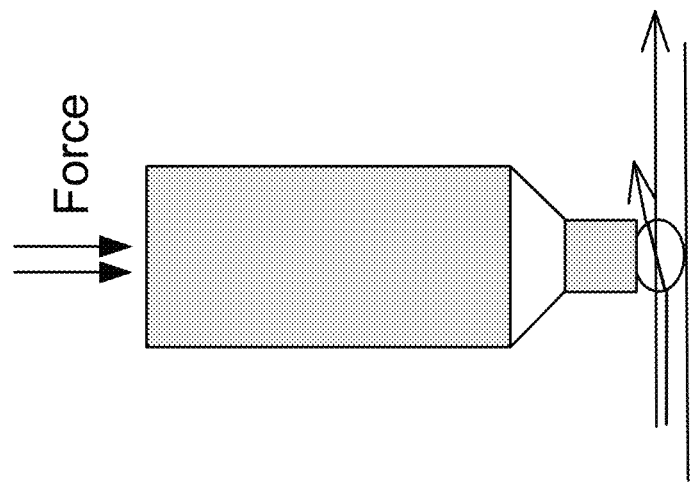
FIGS. 18A-18B illustrates a compliant stylus with a lens that deforms in response to an applied force, according to some embodiments.
Figure 18A:
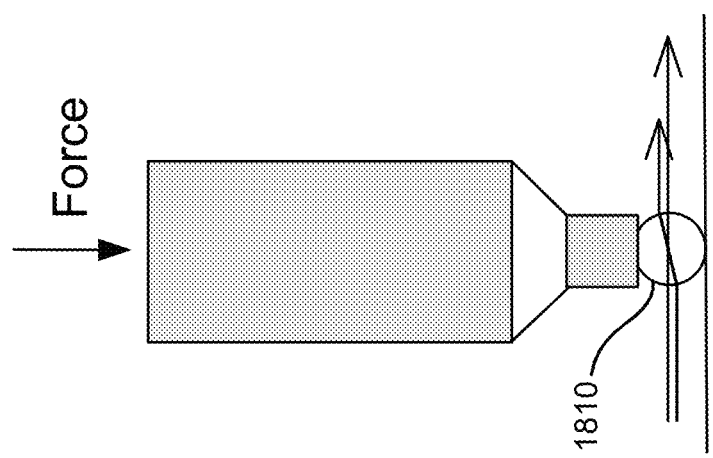

FIGS. 18A-18B illustrate a compliant stylus with a lens that deforms in response to an applied force, according to some embodiments. The stylus includes a tip 1810 that is made of an optically transmissive compliant material. The tip 1810 forms a lens that is deformed in response to an applied force. Deformation of the lens modifies the optical behaviour of the lens such that a strength characteristic can be determined. For example, in response to a compression force, transmission increases in one direction and decreases in another direction. In general, the radius of curvature (and consequently the focal length) of a compliant lens is reduced in response to compression, however the lens can be symmetrical or asymmetrical depending on a desired optical behaviour.

In the examples of FIGS. 18A and 18B, increasing the applied force results in beams being refracted away from the sensing plane. Thus, if the lens is sufficiently deformed, beams passing through the lens may not be received by detectors. In alternative embodiments, compressing the lens increases the amount of light received by one or more detectors. For example, the lens refracts outside light towards a detector. In another example, a light beam is refracted towards a detector that would not otherwise receive the light beam.

Figure 19B:
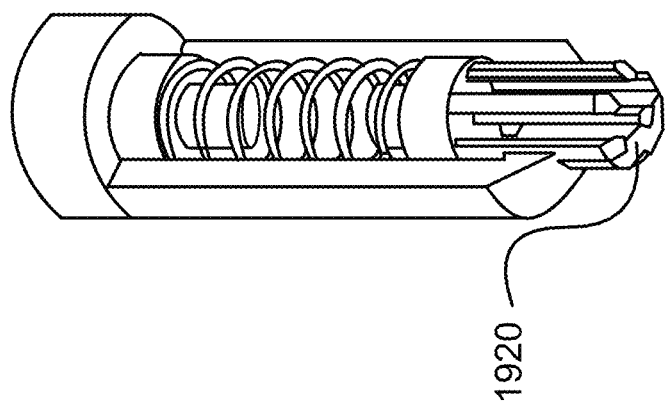
FIGS. 19A-19B is a cut-away view of a compliant stylus tip with protrusions which retreat into the stylus body, according to some embodiments.
Figure 19A:
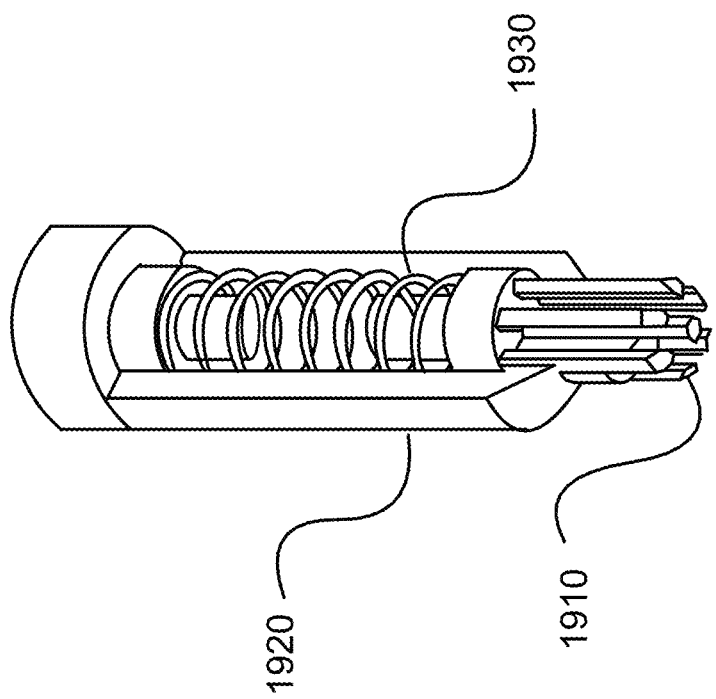

FIGS. 19A-19B is a cut-away view of a stylus tip with protrusions which retreat into the stylus body, according to some embodiments. During a touch event, the protrusions 1910 disturb optical beams on the surface. The protrusions 1910 are pushed into the body 1920 based on an amount of applied force. As the protrusions 1910 slide along a central axis of the stylus, a spring 930 compresses. If the protrusions 1910 protrude out of the stylus body 1920 by less than the height of beams, the stylus body 1920 can also disturb the optical beams.

Compared to styli with envelops 1140, the embodiment of FIGS. 19A-19B may be advantageous when beams pass close to the sensing surface. Styli with rounded envelopes 1140 tend to produce a lensing effect caused by the rounded tip of the envelope 1140. Thus, a rounded envelope 1140 may disrupt beams near the surface differently than beams farther from the surface. However, the embodiment of FIGS. 19A-19B may be advantageous because the transmission profile of the protrusions 1910 remains similar for beam heights ranging from the surface up to the end of the pen body 1920.

As described above, compliant styli typically include tips that deform or mechanically move in response to an applied force. Typically, the amount of movement or deformation corresponds to the amount of beam disturbance. In some embodiments, the amount of movement or deformation is small. This reduces the perceived softness or squishiness of the stylus and may make stylus use feel more natural to a user. For example, a compliant stylus tip may move less than or equal to 2 mm. In one embodiment, the movement or deformation is small enough that it may be undetected by a user. For example, the tip may move less than or equal to 200 µm.

III. Processing Phase

In the processing phase 220 of FIG. 2, the transmission coefficients Tjk are used to determine the characteristics (e.g., location and strength) of touch points. For location characterization, different approaches and techniques can be used, including candidate touch points, line imaging, location interpolation, touch event templates, multi-pass processing and beam weighting. For touch strength estimation, beam transmittance values for beams interacting with the touch under consideration are processed jointly to reflect an aggregated measure of the touch strength.

A. Touch Location

One approach to determine the location of touch points is based on identifying beams that have been affected by a touch event (based on the transmission coefficients Tjk) and then identifying intersections of these interrupted beams as candidate touch points. The list of candidate touch points can be refined by considering other beams that are in proximity to the candidate touch points or by considering other candidate touch points. This approach is described in further detail in U.S. Pat. No. 8,350,831, "Method and Apparatus for Detecting a Multitouch Event in an Optical Touch-Sensitive Device," which is incorporated herein by reference. Location of validated candidate touch points can further be obtained by using touch event templates. This approach is described in further detail in U.S. Pat. No. 9,552,104, "Detecting Multitouch Events in an Optical Touch-Sensitive Device Using Touch Event Templates" which is incorporated herein by reference.

B. Touch Strength

When a touch event is caused by a compliant stylus, the strength characteristic can be determined from the measured beam transmission values Tjk. Specifically, the beam transmittance values convey information as to how strong a tip attenuates the beams, and thus, the amount of applied force. As a result, in some embodiments, increased beam attenuation corresponds with increased touch strength values. However, in alternative embodiments, beam attenuation can be inversely proportional to the strength value. For example, as a user applies more force to a stylus, the stylus increases the transmittance of the beams incident on the stylus.

The strength value can be determined by computing a statistic of beam attenuation from the beams disturbed by a touch event. Beam attenuation is an inverse measure of beam transmission. In some embodiments, beam attenuation is defined as (1−Tjk). The list of beams affected by a touch event can be precomputed for a given touch event location. For example, the beam list for the touch event under consideration can be retrieved once the location of the touch event is known. Alternatively, the beam list can be computed on-the-fly based on the distance between the beams and the touch.

Computing beam statistics to determine a strength value of a touch event (or strength values of multiple touch events) can be based on average beam attenuation, weighted average beam attenuation, median beam attenuation, or percentile analysis. The weights for calculating a weighted average may be based the distance between a beam and the center of the contact area of a touch point (e.g., beams closer to the center of the contact area are given larger weights). Instead of considering all attenuation values, subsets of beam values may be sampled, for example, to increase accuracy or to reduce the computational load. For example, beams may be grouped according to beam direction (e.g., beams within an angular range) or beam attenuation (e.g., beams with attenuation values above a specified threshold). Furthermore, outliers may be removed prior to calculating the beam statistics. For example, the largest and smallest beam attenuation values are removed. These values may correspond to crosstalk between touches in multitouch scenarios.

For a reflective compliant stylus, for example, as described above with reference to FIG. 15, the strength value can be computed by performing similar calculations using (negative) beam attenuation, or more simply beam enhancement, from the beams enhanced by the touch event. In another embodiment for processing a reflective compliant stylus, the strength value can be determined from a combination of enhancement statistics for beams enhanced by the touch and attenuation statistics for beams attenuated by the touch. Enhancement statistics and attenuation statistics can be considered two independent measures of touch strength since they involve two different sets of beams.

In some cases, a beam may be disturbed before a stylus contacts the touch surface (this may be referred to as a pre-touch event). For example, a user raises a stylus from the surface between touch events, however the height of the stylus between touch events is less than the z support (or height) of an optical beam emitted above the surface. Thus, the user may unintentionally disturb beams with the stylus, and the touch device may incorrectly recognize a pre-touch event as a touch event.

To compensate for this, the controller may not recognize a touch event until contact between the touch object and the surface is confirmed. For example, the controller does not indicate a touch event to a drawing application until contact is confirmed. Contact confirmation can be determined from transmission coefficients. Beam disturbances (e.g., beam attenuation) from pre-touch events may be small compared to beam disturbances from touch events, since a larger portion of the stylus impedes beam paths when contact is made with the surface. Furthermore, if a stylus is in contact with the surface, then the tip is experiencing a force that leads to further beam disturbances. Even small forces can lead to large attenuation values (e.g., for styli with gratings). Thus, beam disturbances from a compliant stylus in contact with the surface may be significantly larger than beam disturbances from a pre-touch event. As a result, stylus contact with the surface may be confirmed if beam attenuation is above a threshold value. Additionally, beam disturbances from pre-touches may vary differently than beam disturbances from touch events. For example, stylus contact is confirmed if beam disturbances vary in a range consistent with disturbances of a stylus type (e.g., attenuation values vary from 50% to 0%).

Figure 20:
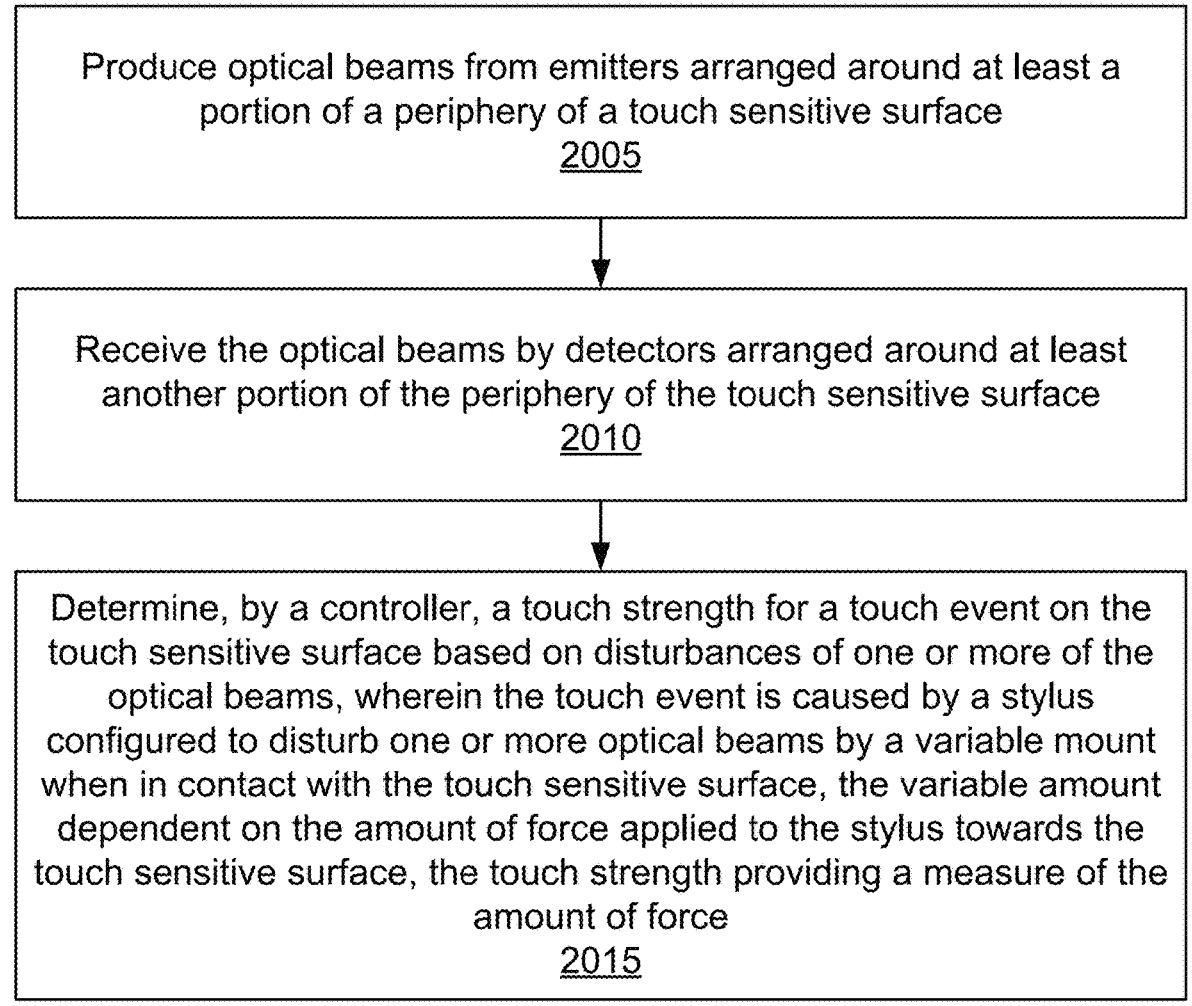
FIG. 20 is a flowchart illustrating a method for determining the touch strength of a touch event caused by a stylus configured to disturb one or more optical beams by a variable mount when in contact with the touch sensitive surface, according to an embodiment.

FIG. 20 is a flowchart illustrating a method for determining the touch strength of a touch event caused by a stylus configured to disturb one or more optical beams by a variable mount when in contact with a touch sensitive surface, according to an embodiment. The steps of the method may be performed in different orders, and the method may include different, additional, or fewer steps.

Optical beams are produced 2005 from emitters arranged around at least a portion of a periphery of a touch sensitive surface. The optical beams are received 2010 by detectors arranged around at least another portion of the periphery of the touch sensitive surface.

A controller determines 2015 a touch strength of a touch event on the touch sensitive surface. The touch strength is based on disturbances of one or more of the optical beams. The touch event is caused by a stylus configured to disturb one or more optical beams by a variable mount when in contact with the touch sensitive surface. The variable amount is dependent on the amount of force applied to the stylus towards the touch sensitive surface, and the touch strength provides a measure of the amount of force.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation, and details of the method and apparatus disclosed herein.

What is claimed is:

1. A system comprising:
a touch sensitive surface having emitters and detectors arranged around at least a portion of a periphery of the touch sensitive surface, the emitters producing optical beams received by the detectors;
a stylus including a body and a component, wherein the component is configured to, while the stylus is in contact with the touch sensitive surface, move relative to the body, and the stylus is configured to disturb one or more of the optical beams by a variable amount, the variable amount dependent on the movement of the component relative to the body due to an amount of force applied to the stylus towards the touch sensitive surface while the stylus is in contact with the touch sensitive surface; and
a controller configured to determine a touch strength of a touch event on the touch sensitive surface by the stylus based on disturbances of one or more of the optical beams, the touch strength providing a measure of the amount of force.

2. The system of claim 1, wherein the stylus is a passive stylus.

3. The system of claim 1, wherein the stylus attenuates the optical beams by an amount that increases in proportion to the amount of force applied to the stylus towards the touch sensitive surface.

4. The system of claim 1, wherein:
the stylus body includes an end portion that is at least partially opaque to optical beams; and
the component is an envelope surrounding the end portion and being more transparent than the end portion, the envelope being configured to slide along the end portion by an amount dependent on the amount of force applied to the stylus towards the touch sensitive surface.

5. The system of claim 1, wherein:
the stylus body has a central axis that is substantially parallel to the force experienced by the stylus when the stylus is in contact with the touch sensitive surface; and
the component is an envelope connected to a spring, the spring attached to an end of the stylus body and orientated to compress along a direction parallel to the central axis, wherein the envelope surrounds the spring and is, at least partially, transparent to optical beams.

6. The system of claim 1, wherein the stylus further includes:
a stylus tip that contacts the touch sensitive surface during a touch event, the stylus tip including a first grating and a second grating aligned with the first grating, the gratings moving relative to one another by an amount dependent on the amount of force applied to the stylus towards the touch sensitive surface, wherein the second grating is the component.

7. The system of claim 6, wherein:
the stylus body is connected to the first grating, the stylus body having a central axis that is substantially parallel to the force experienced by the stylus when the stylus is in contact with the touch sensitive surface, and wherein
the stylus tip comprises an envelope surrounding the gratings and connected to the second grating, the envelope being configured to slide along the stylus body in a direction parallel to the central axis.

8. The system of claim 7, wherein the envelope is connected to the stylus body by an elastomeric material.

9. The system of claim 6, wherein the first grating and the second grating each form a cylinder, the first grating is nested inside the second grating, and the first grating rotates relative to the second grating by an amount determined by the force applied to the stylus towards the touch sensitive surface.

10. The system of claim 6, wherein the first grating and second grating have apertures with a longest dimension less than or equal to 2 millimeters.

11. The system of claim 1, wherein:
the component is a stylus tip that contacts the touch sensitive surface during a touch event; and
the stylus body has a central axis that is substantially parallel to the force experienced by the stylus when the stylus is in contact with the touch sensitive surface, the stylus body including a cavity that surrounds at least a portion of the stylus tip, wherein the stylus body is configured to slide parallel to the central axis and along the tip by an amount dependent on the amount of force applied to the stylus towards the touch sensitive surface.

12. The system of claim 11, wherein the stylus body is tapered towards the stylus tip.

13. The system of claim 11, wherein a width of the stylus body is wide enough to disturb two or more optical beams.

14. The system of claim 11, wherein at least a portion of the touch sensitive surface of stylus body includes a reflective material.

15. The system of claim 11, wherein the stylus tip comprises rubber.

16. The system of claim 1, wherein:
the component is a tip connected to an end of the stylus body and including compliant material, wherein the tip forms or includes an optical lens that deforms dependent on the amount of force applied to the stylus towards the touch sensitive surface.

17. A stylus configured to contact a touch sensitive surface having emitters and detectors arranged around at least a portion of a periphery of the touch sensitive surface, the emitters producing optical beams received by the detectors, wherein the stylus includes a body and a component, wherein the component is configured to, while the stylus is in contact with the touch sensitive surface, move relative to the body, and the stylus is configured to disturb one or more of the optical beams by a variable amount, the variable amount dependent on the movement of the component relative to the body due to an amount of force applied to the stylus towards the touch sensitive surface while the stylus is in contact with the touch sensitive surface.

18. The stylus of claim 17, wherein the stylus is a passive stylus.

19. The stylus of claim 17, wherein the stylus attenuates the optical beams by an amount that increases in proportion to the amount of force applied to the stylus towards the touch sensitive surface.

20. A method comprising:
producing optical beams from emitters arranged around at least a portion of a periphery of a touch sensitive surface;
receiving the optical beams by detectors arranged around at least another portion of the periphery of the touch sensitive surface; and
determining, by a controller, a touch strength for a touch event on the touch sensitive surface based on disturbances of one or more of the optical beams, wherein the touch event is caused by a stylus including a body and a component, wherein the component is configured to, while the stylus is in contact with the touch sensitive surface, move relative to the body, and the stylus is configured to disturb one or more optical beams by a variable mount, the variable amount dependent on the movement of the component relative to the body due to the amount of force applied to the stylus towards the touch sensitive surface while the stylus is in contact with the touch sensitive surface, the touch strength providing a measure of the amount of force.

21. The stylus of claim 20, wherein the stylus is a passive stylus.

22. The stylus of claim 20, wherein the stylus attenuates the optical beams by an amount that increases in proportion to the amount of force applied to the stylus towards the touch sensitive surface.

* * * * *